United States Patent [19]

Oguro

[11] Patent Number: 5,583,654
[45] Date of Patent: Dec. 10, 1996

[54] DIGITAL VIDEO AND AUDIO SIGNAL RECORDING AND REPRODUCING APPARATUS EFFICIENTLY STORING A VARIETY OF DIFFERENT ACCOMPANYING VIDEO AND AUDIO INFORMATION DATA

[75] Inventor: Masaki Oguro, Tokyo, Japan

[73] Assignee: Sony Corporation, Tokyo, Japan

[21] Appl. No.: 159,554

[22] Filed: Dec. 1, 1993

[30] Foreign Application Priority Data

Dec. 4, 1992 [JP] Japan ..................... 4-325618
Jun. 8, 1993 [JP] Japan ..................... 5-164307

[51] Int. Cl.$^6$ ........................................ H04N 5/76
[52] U.S. Cl. .......................... 386/96; 360/27; 386/98
[58] Field of Search ............................ 358/335, 341, 358/343; 360/19.1, 27, 33.1; H04N 5/76, 5/78

[56] References Cited

U.S. PATENT DOCUMENTS

| 4,353,098 | 10/1982 | Heinz et al. ..................... 360/33.1 |
| 5,023,710 | 6/1991 | Kondo et al. ..................... 358/335 |
| 5,130,966 | 7/1992 | Yoshio et al. ..................... 358/341 |
| 5,233,434 | 8/1993 | Furuki et al. ..................... 358/342 |
| 5,396,374 | 3/1995 | Kubota et al. ..................... 358/343 |

FOREIGN PATENT DOCUMENTS

| 0483873 | 5/1992 | European Pat. Off. . |
| 0553817 | 8/1993 | European Pat. Off. . |

Primary Examiner—Tommy P. Chin
Assistant Examiner—Khoi Truong
Attorney, Agent, or Firm—William S. Frommer; Alvin Sinderbrand

[57] ABSTRACT

A video tape recording apparatus records and reproduces digital video and audio signals in the form of coded signals that have a recording format which includes a video signal recording area for recording video data and its respective accompanying information, an audio signal recording area for recording video data and its respective accompanying information, insert and track information and subcode information. Preferably, the recording format includes packs having a pack header having a large data item and a small data item to indicate the format and use of the succeeding pack data. Errors in the recorded and reproduced audio and video signals are detected and the value of the respective accompanying information changed to prevent reading of erroneous stored data and thus prevent propagation of errors.

38 Claims, 36 Drawing Sheets

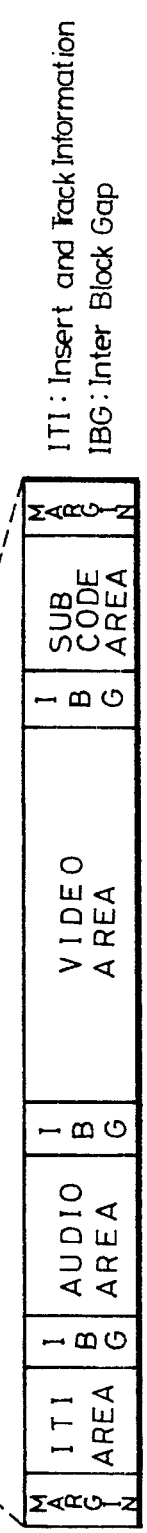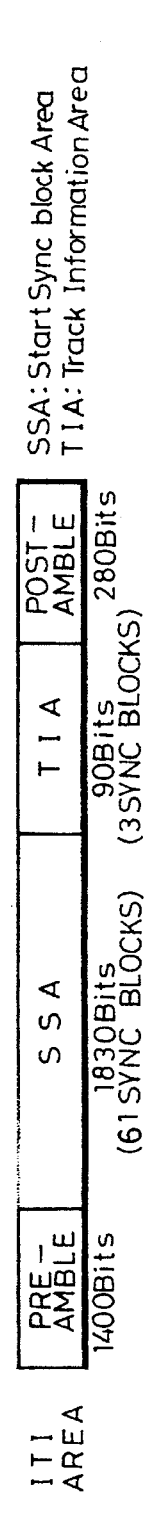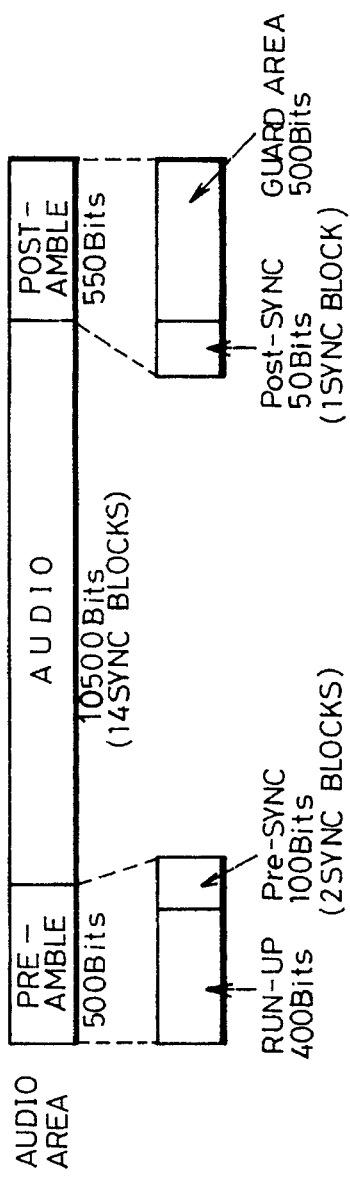

FIG. 3B

| SYNC NO. 10 (Audio SYNC) | SYNC NO. 11 (Parity SYNC) | SYNC NO. 15 (Parity SYNC) | SYNC NO. 16 (Post-SYNC) |
|---|---|---|---|
| SBQ 3, SBQ 2, SBQ 1, SBQ 0, TRACK 3, TRACK 2, TRACK 1, TRACK 0 / SYNC 7–SYNC 0 | APPLI 2, APPLI 1, APPLI 0, SBQ 0, TRACK 3, TRACK 2, TRACK 1, TRACK 0 / SYNC 7–SYNC 0 | APPLI 2, APPLI 1, APPLI 0, SBQ 0, TRACK 3, TRACK 2, TRACK 1, TRACK 0 / SYNC 7–SYNC 0 | APPLI 2, APPLI 1, APPLI 0, SBQ 0, TRACK 3, TRACK 2, TRACK 1, TRACK 0 / SYNC 7–SYNC 0 |
| AAUX / Audio Data | Outer Parity | Outer Parity | Dummy |
| Inner Parity | Inner Parity | Inner Parity | |

(2)

one sync. block of audio

FIG. 5B

| | SYNC NO. 21 (Video SYNC) | ..... | SYNC NO. 155 (Video SYNC) | SYNC NO. 156 (VAUX SYNC) |
|---|---|---|---|---|
| | | | | |
| | SEQ3 SEQ2 SEQ1 SEQ0 TRACK3 TRACK2 TRACK1 TRACK0 / SYNC7 SYNC6 SYNC5 SYNC4 SYNC3 SYNC2 SYNC1 SYNC0 | | SEQ3 SEQ2 SEQ1 SEQ0 TRACK3 TRACK2 TRACK1 TRACK0 / SYNC7 SYNC6 SYNC5 SYNC4 SYNC3 SYNC2 SYNC1 SYNC0 | SEQ3 SEQ2 SEQ1 SEQ0 TRACK3 TRACK2 TRACK1 TRACK0 / SYNC7 SYNC6 SYNC5 SYNC4 SYNC3 SYNC2 SYNC1 SYNC0 |
| | | | | |
| | Video Data | | Video Data | VAUX |
| | Inner Parity | | Inner Parity | Inner Parity |

FIG. 5C

| | | | |
|---|---|---|---|
| Inner Parity | | Inner Parity | |
| Outer Parity | | Outer Parity | Dummy |
| | | | |
| APPLI2 APPLI1 APPLI0 SEQ0 TRACK3 TRACK2 TRACK1 TRACK0 / SYNC7 SYNC6 SYNC5 SYNC4 SYNC3 SYNC2 SYNC1 SYNC0 | | APPLI2 APPLI1 APPLI0 SEQ0 TRACK3 TRACK2 TRACK1 TRACK0 / SYNC7 SYNC6 SYNC5 SYNC4 SYNC3 SYNC2 SYNC1 SYNC0 | APPLI2 APPLI1 APPLI0 SEQ0 TRACK3 TRACK2 TRACK1 TRACK0 / SYNC7 SYNC6 SYNC5 SYNC4 SYNC3 SYNC2 SYNC1 SYNC0 |
| | | | |
| | | | |

SYNC NO. 157 (Parity SYNC) ..... SYNC NO. 167 (Parity SYNC)  SYNC NO. 168 (Post SYNC)

FIG. 7A

| | SYNC<br>2Byte | ID0 | ID1 | IDP<br>3Byte | Subcode Data<br>5Byte | Parity Parity<br>2Byte |
|---|---|---|---|---|---|---|
| SYNC No. 0 | | Tr. FR<br>Tr. AP3 2<br>Tr. AP3 1<br>Tr. AP3 0<br>Tr. No16<br>Tr. No17<br>Tr. No18<br>Tr. No19 | Tr. No20<br>Tr. No21<br>Tr. No22<br>BF<br>SYNC 3<br>SYNC 2<br>SYNC 1<br>SYNC 0 | | | |
| SYNC No. 1 | | Tr. FR<br>Tr. RSV<br>Tr. RSV<br>Tr. RSV<br>No 8<br>No 9<br>No10<br>No11 | Tr. No 12<br>Tr. No 13<br>Tr. No 14<br>Tr. No 15<br>SYNC 3<br>SYNC 2<br>SYNC 1<br>SYNC 0 | | | |
| SYNC No. 2 | | Tr. FR<br>Tr. RSV<br>Tr. RSV<br>Tr. RSV<br>No 0<br>No 1<br>No 2<br>No 3 | Tr. No 4<br>Tr. No 5<br>Tr. No 6<br>Tr. No 7<br>SYNC 3<br>SYNC 2<br>SYNC 1<br>SYNC 0 | | | |
| SYNC No. 3 | | Tr. FR<br>Tr. RSV<br>Tr. RSV<br>Tr. RSV<br>No16<br>No17<br>No18<br>No19 | Tr. No20<br>Tr. No21<br>Tr. No22<br>BF<br>SYNC 3<br>SYNC 2<br>SYNC 1<br>SYNC 0 | | | |

FIG. 7B

| SYNC No. 4 | SYNC No. 5 | SYNC No. 6 | SYNC No. 7 |
|---|---|---|---|
| | | | |
| | | | |
| | | | |
| | | | |
| Tr. FR / Tr. RSV / Tr. RSV / Tr. RSV / Tr. No 8 / Tr. No 9 / Tr. No10 / Tr. No11 / Tr. No12 / Tr. No13 / Tr. No14 / Tr. No15 / SYNC 3 / SYNC 2 / SYNC 1 / SYNC 0 | Tr. FR / Tr. RSV / Tr. RSV / Tr. RSV / Tr. No 0 / Tr. No 1 / Tr. No 2 / Tr. No 3 / Tr. No 4 / Tr. No 5 / Tr. No 6 / Tr. No 7 / SYNC 3 / SYNC 2 / SYNC 1 / SYNC 0 | Tr. FR / AP3 2 / AP3 1 / AP3 0 / Tr. No16 / Tr. No17 / Tr. No18 / Tr. No19 / Tr. No20 / Tr. No21 / Tr. No22 / BF / SYNC 3 / SYNC 2 / SYNC 1 / SYNC 0 | Tr. FR / Tr. RSV / Tr. RSV / Tr. RSV / Tr. No 8 / Tr. No 9 / Tr. No10 / Tr. No11 / Tr. No12 / Tr. No13 / Tr. No14 / Tr. No15 / SYNC 3 / SYNC 2 / SYNC 1 / SYNC 0 |
| | | | |
| | | | |

FIG. 7C

| SYNC No. 8 | SYNC No. 9 | SYNC No. 10 | SYNC No. 11 |
|---|---|---|---|
| Tr. FR<br>Tr. RSV<br>Tr. RSV<br>Tr. RSV<br>Tr. No 0<br>Tr. No 1<br>Tr. No 2<br>Tr. No 3 | Tr. FR<br>Tr. RSV<br>Tr. RSV<br>Tr. RSV<br>Tr. No 16<br>Tr. No 17<br>Tr. No 18<br>Tr. No 19 | Tr. FR<br>Tr. RSV<br>Tr. RSV<br>Tr. RSV<br>Tr. No 8<br>Tr. No 9<br>Tr. No 10<br>Tr. No 11 | Tr. FR<br>APT 2<br>APT 1<br>APT 0<br>Tr. No 0<br>Tr. No 1<br>Tr. No 2<br>Tr. No 3 |
| Tr. No 4<br>Tr. No 5<br>Tr. No 6<br>Tr. No 7<br>SYNC 3<br>SYNC 2<br>SYNC 1<br>SYNC 0 | Tr. No20<br>Tr. No21<br>Tr. No22<br>BF<br>SYNC 3<br>SYNC 2<br>SYNC 1<br>SYNC 0 | Tr. No12<br>Tr. No13<br>Tr. No14<br>Tr. No15<br>SYNC 3<br>SYNC 2<br>SYNC 1<br>SYNC 0 | Tr. No 4<br>Tr. No 5<br>Tr. No 6<br>Tr. No 7<br>SYNC 3<br>SYNC 2<br>SYNC 1<br>SYNC 0 |

[AAUX]

| TRACK NO. → | 1 | 2 | 3 | 4 | 5 | 6 | 7 | 8 | 9 | 10 |
|---|---|---|---|---|---|---|---|---|---|---|
| 10 | 55 |  | 55 |  | 55 |  | 55 |  | 55 |  |
| 9 | 54 |  | 54 |  | 54 |  | 54 |  | 54 |  |
| 8 | 53 |  | 53 |  | 53 |  | 53 |  | 53 |  |
| 7 | 52 | 55 | 52 | 55 | 52 | 55 | 52 | 55 | 52 | 55 |
| 6 | 51 | 54 | 51 | 54 | 51 | 54 | 51 | 54 | 51 | 54 |
| 5 | 50 | 53 | 50 | 53 | 50 | 53 | 50 | 53 | 50 | 53 |
| 4 |  | 52 |  | 52 |  | 52 |  | 52 |  | 52 |
| 3 |  | 51 |  | 51 |  | 51 |  | 51 |  | 51 |
| 2 |  | 50 |  | 50 |  | 50 |  | 50 |  | 50 |

↑ PACK NO.

50~55 : AAUX

FIG. 13

| Word Name | | MSB | | LSB |
|---|---|---|---|---|
| PC0 | (ITEM) | | | |
| PC1 | | | | |
| PC2 | (DATA) | | | |
| PC3 | | | | |
| PC4 | | | | |

FIG. 14

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 | x x x x | RESERVED |
| 1 1 1 0 | x x x x | |
| 1 1 1 1 | a a a a | SOFT MODE |
| 1 1 1 1 | 1 1 1 1 | NO INFORMATION |

FIG. 15A

| UPPER / LOWER | 0000 CONTROL | 0001 TITLE | 0010 CHAPTER | 0011 PART | 0100 PROGRAM | 0101 AAUX | 0110 VAUX | 0111 CAMERA | 1000 LINE | 1001 1110 | 0111 SOFT MODE |
|---|---|---|---|---|---|---|---|---|---|---|---|
| 0000 | CASSETTE ID | TOTAL TIME | TOTAL TIME | TOTAL TIME | TOTAL TIME | SOURCE | SOURCE | CONSUMER CAMERA 1 | LINE HEADER | | MAKER CODE |
| 0001 | TAPE LENGTH | REMAIN TIME | REMAIN TIME | REMAIN TIME | REMAIN TIME | SOURCE CONTROL | SOURCE CONTROL | CONSUMER CAMERA 2 | Y | | OPTION |
| 0010 | TIMER REC DATE | CHAPTER TOTAL No. | CHAPTER No. | PART No. | REC DTIME | REC DATE | REC DATE | R S V | R-Y | RSV | OPTION |
| 0011 | TIMER REC S/S | TIME CODE | TIME CODE | TIME CODE | TIME CODE | REC TIME | REC TIME | LENS | B-Y | | OPTION |
| 0100 | REC START POINT | BINARY GROUP | BINARY GROUP | BINARY GROUP | BINARY GROUP | BINARY GROUP | BINARY GROUP | GAIN | R S V | | OPTION |
| 0101 | REC START POINT | CASSETTE No. | RSV | RSV | RSV | T.B.D. | CLOSED CAPTION | PEDESTAL | R | | OPTION |
| 0110 | TAG. ID No. | SOFT ID | RSV | RSV | RSV | RSV | RSV | GAMMA | G | | OPTION |
| 0111 | TOPIC /PAGE HEADER | SOFT ID | RSV | RSV | RSV | RSV | TELE TEXT | DETAIL | B | | OPTION |
| 1000 | TEXT HEADER | TEXT HEADER | TEXT HEADER | TEXT HEADER | TEXT HEADER | TEXT HEADER | TEXT HEADER | TEXT HEADER | TEXT HEADER | | OPTION |

FIG. 15B

| | | | | | | | | | | |
|---|---|---|---|---|---|---|---|---|---|---|
| 1001 | TEXT | TEXT | TEXT | TEXT | TEXT | TEXT | TEXT | TEXT | | OPTION |
| 1010 | TAG | TITLE START | CHAPTER START | PART START | PROGRAM START | RSV | SHUTTER | RSV | | OPTION |
| 1011 | TAG | TITLE START | CHAPTER START | PART START | PROGRAM START | RSV | KNEE | RSV | RSV | OPTION |
| 1100 | RSV | REEL ID | RSV | RSV | RSV | RSV | FLARE | RSV | | OPTION |
| 1101 | RSV | REEL ID | RSV | RSV | RSV | RSV | SHADING | RSV | | OPTION |
| 1110 | ZONE END | TITLE END | CHAPTER END | PART END | PROGRAM END | RSV | RSV | RSV | | OPTION |
| 1111 | ZONE END | TITLE END | CHAPTER END | PART END | PROGRAM END | RSV | RSV | RSV | | NO INFO |

▭ MIC Main area  ▭ VAUX Main area
▨ Subcode Main area  ▨ AAUX Main area

* EX. UPPER=0101, LOWER=1101 ⇒ PACK HEADER (PCO)=01011101 (5Dh) PACK HEADER

FIG. 16A

TAPE ID

| | MSB | | | | | | | LSB |
|---|---|---|---|---|---|---|---|---|
| PC 0 | 0 | 0 | 0 | 0 | 0 | 0 | 0 | 0 |
| PC 1 | APPLI DATA | | | | CLK SPEED | | | |
| PC 2 | ╳ | | THICKNESS | | TAPE TYPE | | | |
| PC 3 | ╳ | | MEMORY TYPE | | MEMORY SYZE | | | |
| PC 4 | MANUFACTURER CODE | | | | | | | |

FIG. 16B

TAPE LENGTH

| | MSB | | | | | | | LSB |
|---|---|---|---|---|---|---|---|---|
| PC 0 | 0 | 0 | 0 | 0 | 0 | 0 | 0 | 1 |
| PC 1 | ────────────────→LSB | | | | | | | 1 |
| PC 2 | ────── TAPE LENGTH ────── | | | | | | | |
| PC 3 | MSB←───── (BINARY) ────── | | | | | | | |
| PC 4 | ═══════════════════ | | | | | | | R S |

FIG. 16C

TIMER REC DATE

| | MSB | | | | | | | LSB |
|---|---|---|---|---|---|---|---|---|
| PC 0 | 0 | 0 | 0 | 0 | 0 | 0 | 1 | 0 |
| PC 1 | NO. | | | | MODE | | | |
| PC 2 | 0 | 0 | | DAY | | | | |
| PC 3 | WEEK | | | | MONTH | | | |
| PC 4 | YEAR | | | | | | | |

FIG. 16D

TIMER REC S/S

| | MSB | | | | | | | LSB |
|---|---|---|---|---|---|---|---|---|
| PC 0 | 0 | 0 | 0 | 0 | 0 | 0 | 1 | 1 |
| PC 1 | START MINUTES | | | | | | | |
| PC 2 | START HOURS | | | | | | | |
| PC 3 | STOP MINUTES | | | | | | | |
| PC 4 | STOP HOURS | | | | | | | |

FIG. 16E

REC ST POINT

| | MSB | | | | | | | LSB |
|---|---|---|---|---|---|---|---|---|
| PC 0 | 0 | 0 | 0 | 0 | 0 | 1 | 0 | 1 |
| PC 1 | ------------→LSB | | | | | | | 1 |
| PC 2 | -------- TRACK NO. -------- | | | | | | | |
| PC 3 | MSB←----- (BINARY) -------- | | | | | | | |
| PC 4 | REC TYPE | | | | SL | RP | ⌧ | RS |

FIG. 16F

"TP HEADER"(TOPIC/PAGE HEADER)

| | MSB | | | | | | | LSB |
|---|---|---|---|---|---|---|---|---|
| PC 0 | 0 | 0 | 0 | 0 | 0 | 1 | 1 | 1 |
| PC 1 | LANGUAGE TAG | | | | TOPIC TAG | | | |
| PC 2 | RE | | TENS OF LPU | | UNITS OF LPU | | | |
| PC 3 | DM | | SCRL | H/V | INIT | RASTER COLOR | | |
| PC 4 | 1 | | TENS OF PU NO. | | UNITS OF PU NO. | | | |

FIG. 16G

CONTROL TEXT HEADER

| | MSB | | | | | | | LSB |
|---|---|---|---|---|---|---|---|---|
| PC 0 | 0 | 0 | 0 | 0 | 1 | 0 | 0 | 0 |
| PC 1 | TEXT CODE | | | | | | | |
| PC 2 | PN | | | | TEXT TYPE | | | |
| PC 3 | TENS OF TTNO | | | | UNITS OF TTNO | | | |
| PC 4 | | | | | | | | |

FIG. 16H

CONTROL TEXT

| | MSB | | | | | | | LSB |
|---|---|---|---|---|---|---|---|---|
| PC 0 | 0 | 0 | 0 | 0 | 1 | 0 | 0 | 1 |
| PC 1 | | | | | | | | |
| PC 2 | | | | | | | | |
| PC 3 | | | | | | | | |
| PC 4 | | | | | | | | |

FIG. 17A

TITLE TOTAL TIME

| | MSB | | | | | | | LSB |
|---|---|---|---|---|---|---|---|---|
| PC 0 | 0 | 0 | 0 | 1 | 0 | 0 | 0 | 0 |
| PC 1 | 0 | DF | FRAMES | | | | | |
| PC 2 | SECONDS | | | | | | | |
| PC 3 | MINUTES | | | | | | | |
| PC 4 | HOURS | | | | | | | |

FIG. 17B

TITLE REMAIN TIME

| | MSB | | | | | | | LSB |
|---|---|---|---|---|---|---|---|---|
| PC 0 | 0 | 0 | 0 | 1 | 0 | 0 | 0 | 1 |
| PC 1 | 0 | DF | FRAMES | | | | | |
| PC 2 | SECONDS | | | | | | | |
| PC 3 | MINUTES | | | | | | | |
| PC 4 | HOURS | | | | | | | |

FIG. 17C

TITLE TIME CODE

| | MSB | | | | | | | LSB |
|---|---|---|---|---|---|---|---|---|
| PC 0 | 0 | 0 | 0 | 1 | 0 | 0 | 1 | 1 |
| PC 1 | CF | DF | TENS OF FR. | UNITS OF FRAMES | | | | |
| PC 2 | PC | TENS OF SECONDS | | UNITS OF SECONDS | | | | |
| PC 3 | BF | TENS OD MINUTES | | UNITS OF MINUTES | | | | |
| PC 4 | BF | UA | TENS OF H. | UNITS OF HOURS | | | | |

FIG. 17D

TITLE TIME CODE BINARY GROUP

| | MSB | | | | | | | LSB |
|---|---|---|---|---|---|---|---|---|
| PC 0 | 0 | 0 | 0 | 1 | 0 | 1 | 0 | 0 |
| PC 1 | 2nd BINARY | | | | 1st BINARY | | | |
| PC 2 | 4th BINARY | | | | 3rd BINARY | | | |
| PC 3 | 6th BINARY | | | | 5th BINARY | | | |
| PC 4 | 8th BINARY | | | | 7th BINARY | | | |

FIG. 18A

LINE HEADER

| | MSB | | | | | | | LSB |
|---|---|---|---|---|---|---|---|---|
| PC 0 | 1 | 0 | 0 | 0 | 0 | 0 | 0 | 0 |
| PC 1 | L I N E S (BINARY) |
| PC 2 | B/W | EN | C L F | C M | |
| PC 3 | T D S (BINARY) |
| PC 4 | Q U | SAMPLING fr. | |

FIG. 18B

LINE Y

| | MSB | | | | | | | LSB |
|---|---|---|---|---|---|---|---|---|
| PC 0 | 1 | 0 | 0 | 0 | 0 | 0 | 0 | 1 |
| PC 1 | | | | | | | | |
| PC 2 | | | | | | | | |
| PC 3 | | | | | | | | |
| PC 4 | | | | | | | | |

FIG. 18C

LINE R−Y

| | MSB | | | | | | | LSB |
|---|---|---|---|---|---|---|---|---|
| PC 0 | 1 | 0 | 0 | 0 | 0 | 0 | 1 | 0 |
| PC 1 | | | | | | | | |
| PC 2 | | | | | | | | |
| PC 3 | | | | | | | | |
| PC 4 | | | | | | | | |

FIG. 18D

LINE B−Y

| | MSB | | | | | | | LSB |
|---|---|---|---|---|---|---|---|---|
| PC 0 | 1 | 0 | 0 | 0 | 0 | 0 | 1 | 1 |
| PC 1 | | | | | | | | |
| PC 2 | | | | | | | | |
| PC 3 | | | | | | | | |
| PC 4 | | | | | | | | |

FIG. 18E

LINE R

| | MSB | | | | | | | LSB |
|---|---|---|---|---|---|---|---|---|
| PC 0 | 1 | 0 | 0 | 0 | 0 | 1 | 0 | 1 |
| PC 1 | | | | | | | | |
| PC 2 | | | | | | | | |
| PC 3 | | | | | | | | |
| PC 4 | | | | | | | | |

FIG. 18F

LINE G

| | MSB | | | | | | | LSB |
|---|---|---|---|---|---|---|---|---|
| PC 0 | 1 | 0 | 0 | 0 | 0 | 1 | 1 | 0 |
| PC 1 | | | | | | | | |
| PC 2 | | | | | | | | |
| PC 3 | | | | | | | | |
| PC 4 | | | | | | | | |

FIG. 18G

LINE B

| | MSB | | | | | | | LSB |
|---|---|---|---|---|---|---|---|---|
| PC 0 | 1 | 0 | 0 | 0 | 0 | 1 | 1 | 1 |
| PC 1 | | | | | | | | |
| PC 2 | | | | | | | | |
| PC 3 | | | | | | | | |
| PC 4 | | | | | | | | |

FIG. 19

| LINE HEADER | Y PACK | Y PACK | Y PACK | Y PACK | R-Y PACK | B-Y PACK | - - - - - - |
|---|---|---|---|---|---|---|---|

FIG. 21A

VAUX SOURCE

| | MSB | | | | | | | LSB |
|---|---|---|---|---|---|---|---|---|
| PC 0 | 0 | 1 | 1 | 0 | 0 | 0 | 0 | 0 |
| PC 1 | B/W | EN | COLOR | | >< | | COMPRES | |
| PC 2 | TENS OF TV CHANNEL | | | | UNITS OF TV CHANNEL | | | |
| PC 3 | TUNER CATEGORY | | | | | | | HS TV |
| PC 4 | GENRE CATEGORY | | | | | | | |

FIG. 21B

VAUX REC DATE

| | MSB | | | | | | | LSB |
|---|---|---|---|---|---|---|---|---|
| PC 0 | 0 | 1 | 1 | 0 | 0 | 0 | 1 | 0 |
| PC 1 | ST | TM | TIME ZONE | | | | | |
| PC 2 | 0 | 0 | DAY | | | | | |
| PC 3 | WEEK | | | MONTH | | | | |
| PC 4 | YEAR | | | | | | | |

FIG. 21C

VAUX REC TIME

| | MSB | | | | | | | LSB |
|---|---|---|---|---|---|---|---|---|
| PC 0 | 0 | 1 | 1 | 0 | 0 | 0 | 1 | 1 |
| PC 1 | CF | DF | TENS OF FR. | | UNITS OF FRAMES | | | |
| PC 2 | PC | TENS OF SECONDS | | | UNITS OF SECONDS | | | |
| PC 3 | BF | TENS OD MINUTES | | | UNITS OF MINUTES | | | |
| PC 4 | BF | UA | TENS OF H. | | UNITS OF HOURS | | | |

FIG. 21D

VAUX REC TIME BINARY GROUP

| | MSB | | | | | | | LSB |
|---|---|---|---|---|---|---|---|---|
| PC 0 | 0 | 1 | 1 | 0 | 0 | 1 | 0 | 0 |
| PC 1 | 2nd BINARY | | | | 1st BINARY | | | |
| PC 2 | 4th BINARY | | | | 3rd BINARY | | | |
| PC 3 | 6th BINARY | | | | 5th BINARY | | | |
| PC 4 | 8th BINARY | | | | 7th BINARY | | | |

MAKER CODE

| | MSB | | | | | | | LSB |
|---|---|---|---|---|---|---|---|---|
| PC 0 | 1 | 1 | 1 | 1 | 0 | 0 | 0 | 0 |
| PC 1 | \multicolumn{8}{c|}{MAKER CODE} |
| PC 2 | | | | | | | | |
| PC 3 | | | | | | | | |
| PC 4 | | | | | | | | |

MEMORY in CASSETE MEMORY MAP

▨ : APPLI DATA

PACK 1 : TAPE ID

PACK 2 : TAPE LENGTH

FIG. 27A-1
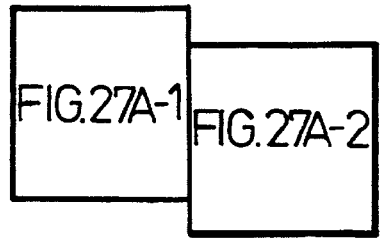
FIG. 27A
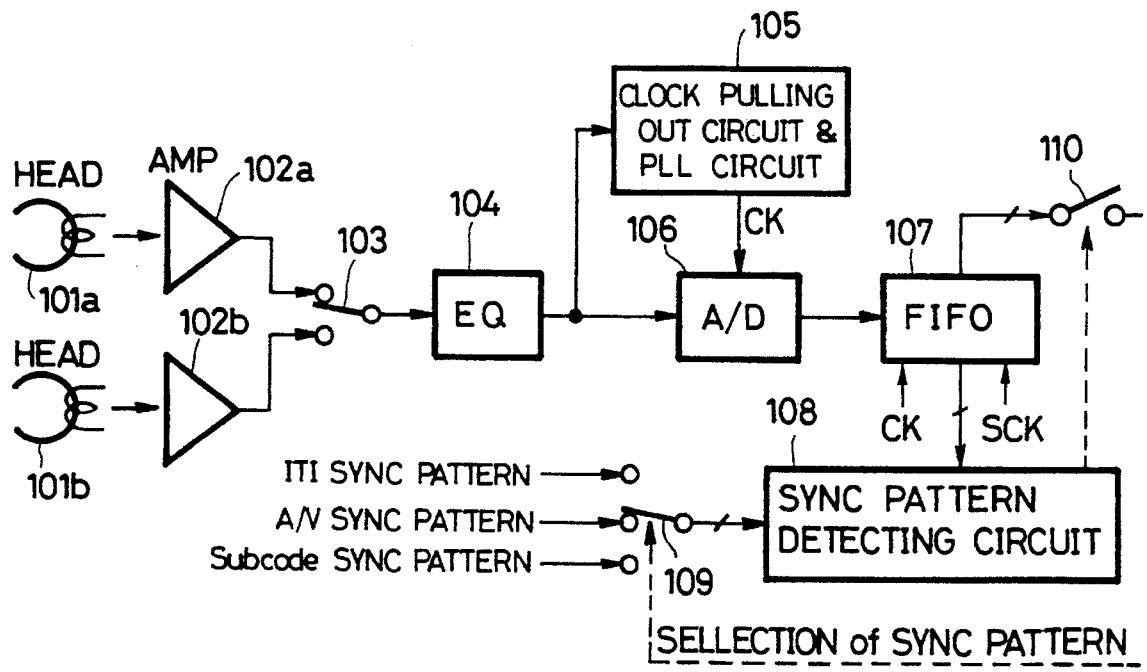
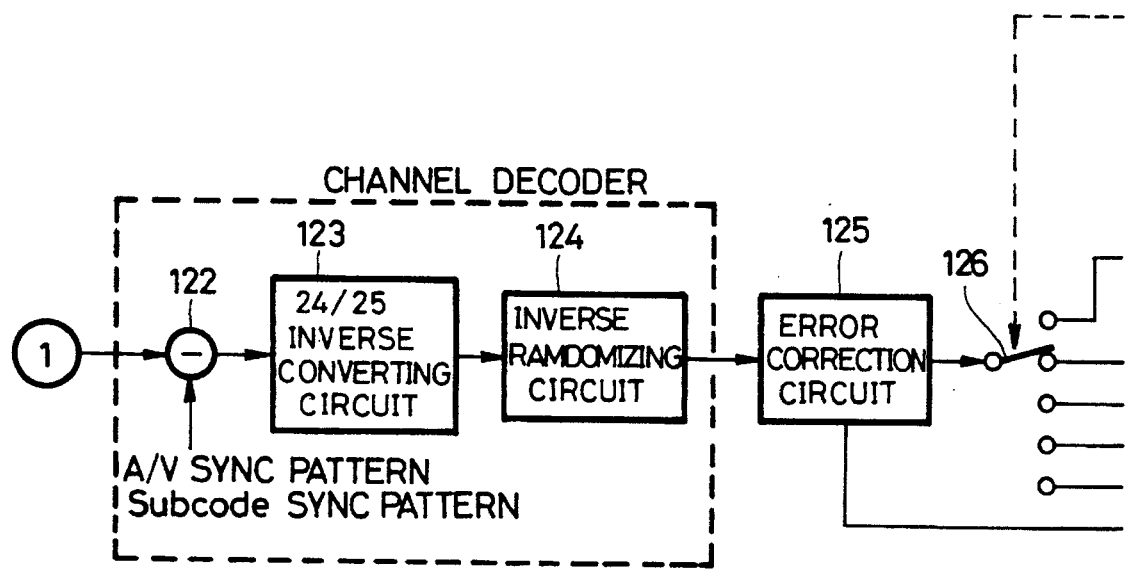

DIGITAL VIDEO AND AUDIO SIGNAL RECORDING AND REPRODUCING APPARATUS EFFICIENTLY STORING A VARIETY OF DIFFERENT ACCOMPANYING VIDEO AND AUDIO INFORMATION DATA

BACKGROUND OF THE INVENTION

The present invention relates to a digital video and audio signal recording and reproducing apparatus for recording and reproducing video and audio signals in the form of coded signals and, more particularly to recording such coded signals in pre-defined packs.

Various devices have been proposed for recording and reproducing video and audio signals in the form of coded digital signals. Presently, devices such as a component system VTR using what is known as the D1 format, a composite system VTR using what is known as the D2 format, and similar systems are now commercially available and capable of serving as commercial VTRs. Furthermore, various digital VTRs that employ data compression are currently under development.

In addition to recording and reproducing a video signal and an audio signal in the form of coded digital signals, these prior VTRs also record and reproduce accompanying data indicative of recording date, recording time, title and chapter of the recorded program. Other non-video data also is inserted into the vertical blanking period of the video signal. In particular, when such prior VTRs are used as professional VTRS, information may be transmitted and received during a time period that does not coincide with the effective (viewing) area of the video signal, and this information and the original television signal must both be properly recorded and reproduced.

In such a prior VTR, the hardware and software required to process all the accompanying data can become very complex. Additionally, in order to provide a format for recording a variety of different types of accompanying data, the capacity of the recording region of the tape must be increased. However, there is also strong demand to miniaturize the apparatus and this increases the difficulty of increasing the recording capacity of the device.

Thus, the prior art has generally failed to provide a digital VTR capable of recording and reproducing a variety of different types of accompanying data, in addition to the audio and video signals, in an efficient manner and in a format that saves storage capacity.

OBJECTS AND SUMMARY OF THE INVENTION

An object of the present invention is to provide a digital video and audio signal recording and reproducing apparatus which overcomes the problems associated with the prior art.

More specifically, it is an object of the present invention to provide a digital video and audio signal recording and reproducing apparatus for storing a variety of different types of data accompanying the video and audio signals in an efficient manner that saves storage capacity.

Another object of the present invention is to provide an apparatus for recording a video signal, an audio signal and accompanying information in a predefined format and for reproducing information stored in such a format.

Yet another object of the present invention is to provide an apparatus in which errors in the recorded information are detected, and to provide a recording format that includes an indication of an error and prevents propagation of recording errors.

In accordance with an aspect of the present invention, an apparatus is provided for recording digital video and audio signals in the form of coded signals having a recorded format which includes a video signal recording area for recording video data and accompanying information and an audio signal recording area for recording audio data and respective accompanying information, in which the apparatus includes an input for inputting a composite audio signal and a composite video signal; an analog-to-digital converter for converting the composite video signal and the composite audio signal to a digital video signal and to a digital audio signal; a compressor for compressing the digital video signal; a frame for framing the digital video signal and the digital audio signal thereby forming blocks of video signals and blocks of audio signals; a formatter for formatting accompanying audio data and accompanying video data into a predefined format; a combiner for combining the blocks of audio signals with the formatted accompanying audio data thereby forming combined audio information and for combining the blocks of video signals with the formatted accompanying video data thereby forming combined video information; an identifier for generating identification parameters corresponding either to the combined audio information or to the combined video information; and an encoder for encoding the identification parameters, the combined audio information and the combined video information into coded signals for recording onto a recording medium.

In accordance with a second aspect of the present invention, an apparatus for reproducing digital video and audio signals recorded in the form of coded signals having a recording format which includes a video signal recording area for recording video data and respective accompanying information and an audio signal recording area for recording video data and respective accompanying information is provided, including a reader for reading the coded signals from a recording medium; a decoder for decoding the coded signals into combined audio information and into combined video information; a detector for detecting whether a portion of the combined video information consists of blocks of video signals or of formatted accompanying video information and for accordingly separating the portions; a deframer for deframing the portion which consists of blocks of video signals into digital video signals; a decompressor for decompressing the digital video signals; a digital-to-analog convertor for converting the decompressed digital video signals into analog video signals; and a separator for separating the portion consisting of formatted accompanying video information based on the accompanying video information.

In accordance with another aspect of the present invention, an apparatus for recording and reproducing digital video and audio signals in the form of coded signals having a recording video format which includes a video signal recording area for recording video data and respective accompanying information and an audio signal recording area for recording audio data and respective accompanying information is provided.

Other objects, features and advantages of the present invention will become apparent from the following detailed description when read in conjunction with the accompanying drawings in which corresponding elements are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 7 is a diagram showing a recording format of a subcode sector of a subcode area of the embodiment of FIG. 1;

FIG. 13 is a diagram showing the pack data structure of a universal pack;

FIG. 14 is a diagram showing the "large" items of the pack headers;

FIG. 15 is a diagram showing the "small" items corresponding to each respective large item;

FIGS. 16(1)–16(8) are diagrams showing the formats of the packs of the small items included in the "control" large item;

FIGS. 17(1)–17(4) are diagrams showing the respective formats of the packs of the small items included in the "title" large item;

FIGS. 18(1)–18(7) are diagrams showing the respective formats of the packs of the small items included in the "line" large item;

FIG. 19 is a diagram showing an example of an arrangement of video data stored using the "line" large item packs of FIGS. 18(1)–18(7);

FIGS. 21(1)–21(4) are diagrams showing the respective packs of the small items included in the "video auxiliary data" large item;

DETAILED DESCRIPTION OF THE PREFERRED EMBODIMENTS

Figure 1E:
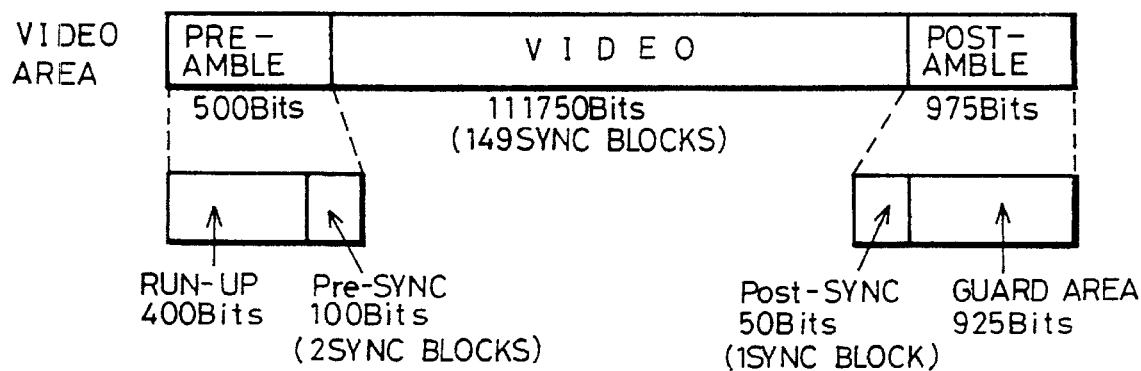
FIGS. 1A–1E are diagrams showing an embodiment of a recording format of one frame of digital data.

A recording format for an embodiment of the present invention is shown in FIGS. 1A–1E. FIG. 1A illustrates a plurality of helically recorded tracks that form one video picture frame. In the NTSC format, a frame is recorded in ten tracks and in the PAL format a frame is recorded in 12 tracks. Referring now to FIG. 1B, the recording format for one track is shown. The track is bounded by margins, and starting from the leftmost margin, which represents the recording start end, are an Insert and Track Information (ITI) Area, an audio area, a video area and a subcode area. Also present between each of these areas are inter-block gaps which serve as a margin for editing and for prevention of overwriting of data.

Figure 2:
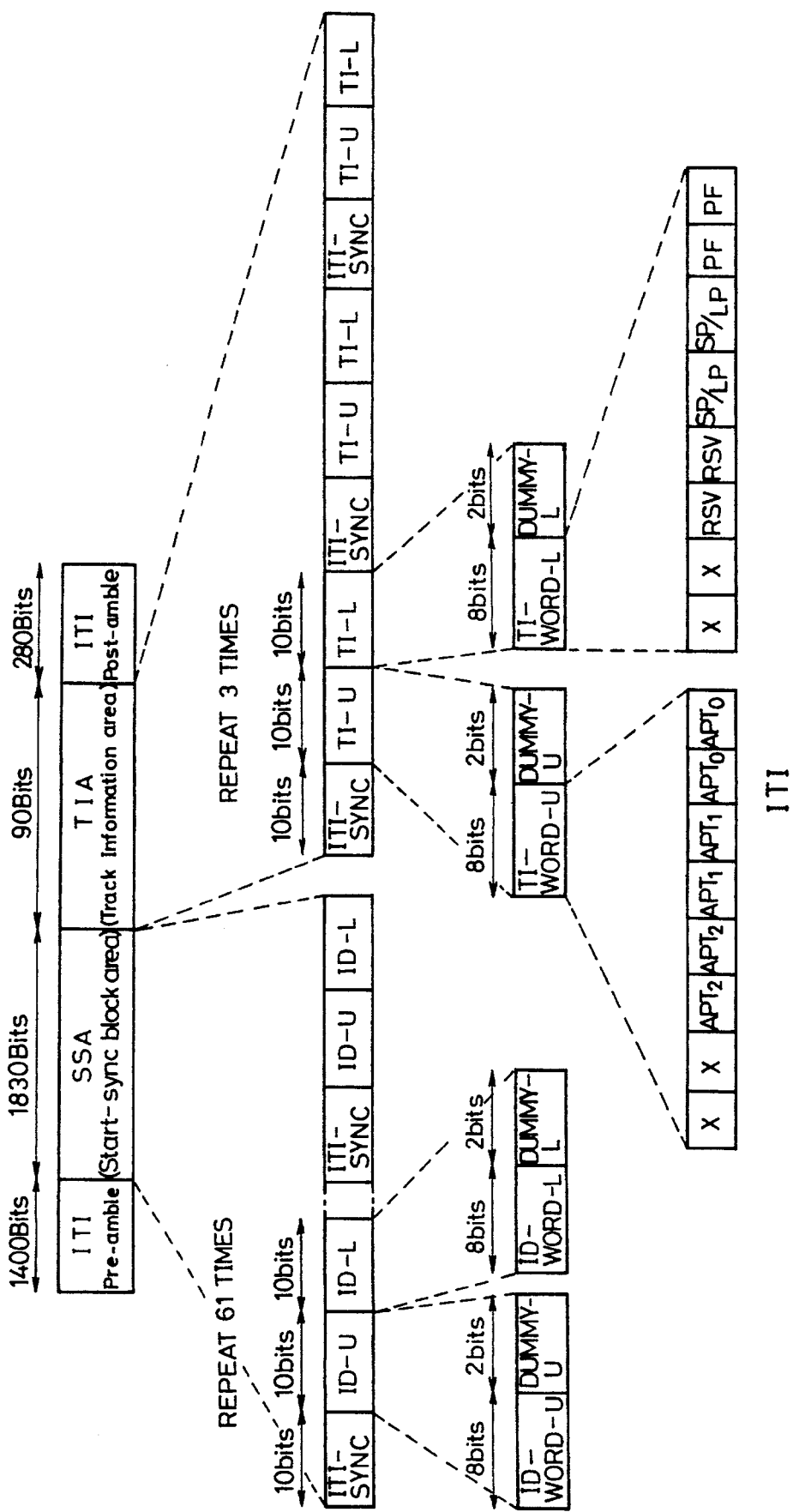
FIG. 2 is a diagram showing the format of the ITI area of the embodiment of FIG. 1.

The ITI area serves to store position information useful for proper head scanning of the track and functions in a manner similar to the ATF signal of an 8 mm video tape. Referring now to FIG. 2, the ITI area includes a pre-amble sector, a start-sync block (SSA) sector, a track information sector (TIA), and a post-amble sector. The TIA sector has a length of 90 bits and includes three blocks (ITI-SYNC, TI-U, TIL) that are each recorded three times. The TIU (track info upper) block includes the main application identification data (APT) which defines the data structure of the remainder of the track. For the present embodiment, the value of APT is 000 which indicates that the areas following the ITI area are an audio area, a video area, and a subcode area. Alternatively, other structures for the track are possible and would be represented by a different value for APT.

The TI-L (TI-word-lower) block includes SP/LP data and pilot frame (PF) data. The SP/LP data provides information as to whether the track has been recorded for standard play, SP/LP=0, or for long play, SP/LP=1.

Figure 3:
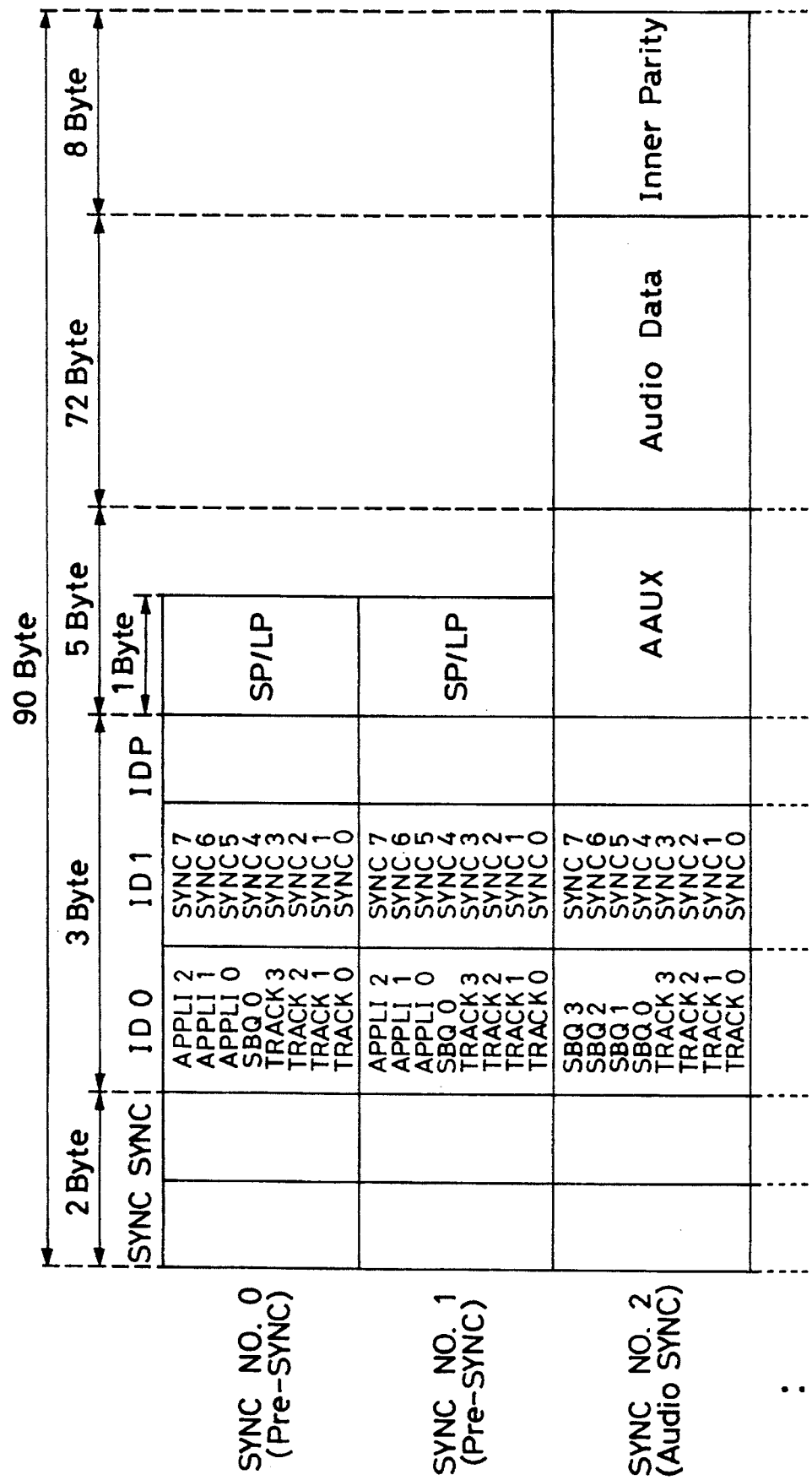
FIG. 3 is a diagram showing a recording format of an audio sector of an audio area of the embodiment of FIG. 1.
Figure 4:
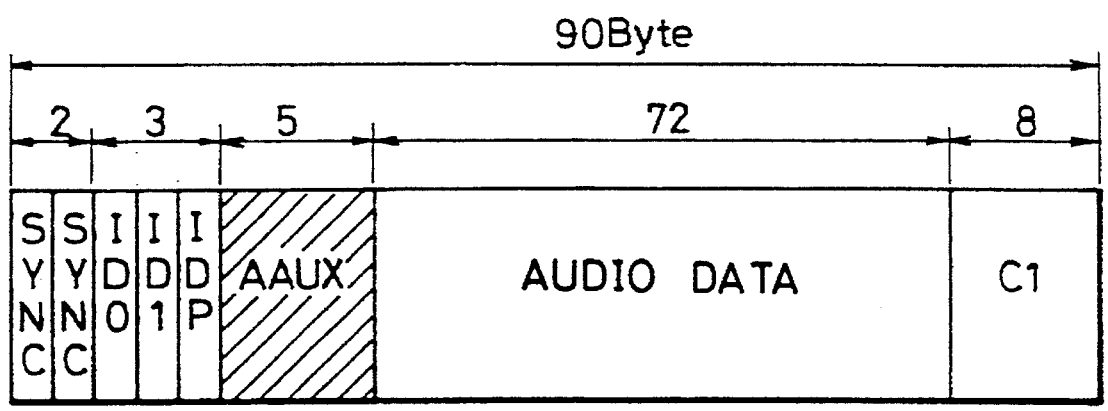
FIG. 4 is a diagram showing in detail one sync block of the audio sector of FIG. 3.

As shown in FIG. 1D, the audio area is comprised of a pre-amble sector, which includes a run-up block and a pre-sync block, an audio sector and a post-amble sector, which includes post-sync and guard area blocks. Referring now to FIG. 3, the audio sector of the audio area is divided into 17 sync blocks, numbered 0–16. Each of the sync blocks include a 2 byte sync region and a 3 byte ID region. The ID region is divided into an ID0 byte, an ID1 byte and an IDP byte. The ID0 byte stores application data bits APPLI indicating the data format of the sync blocks, sequencing data bits SEQ for identifying the frame number during a variable speed playback mode and track data bits TRACK for identifying the track number of the frame; while the ID1 byte stores sync data, and the IDP byte stores parity data. Sync blocks 0 and 1 are pre-sync blocks and include an additional byte of SP-LP data. Sync blocks 2–10 are audio sync blocks and include 5 bytes of auxiliary information (AAUX), 72 bytes of audio data, and 8 bytes of inner parity data. FIG. 4 illustrates one of audio sync blocks 2–10. Sync blocks 11 to 15 are parity sync blocks and include 80 bytes of outer parity data and 8 bytes of inner parity data. Sync block number 16 is a post-sync block.

Figure 5A:
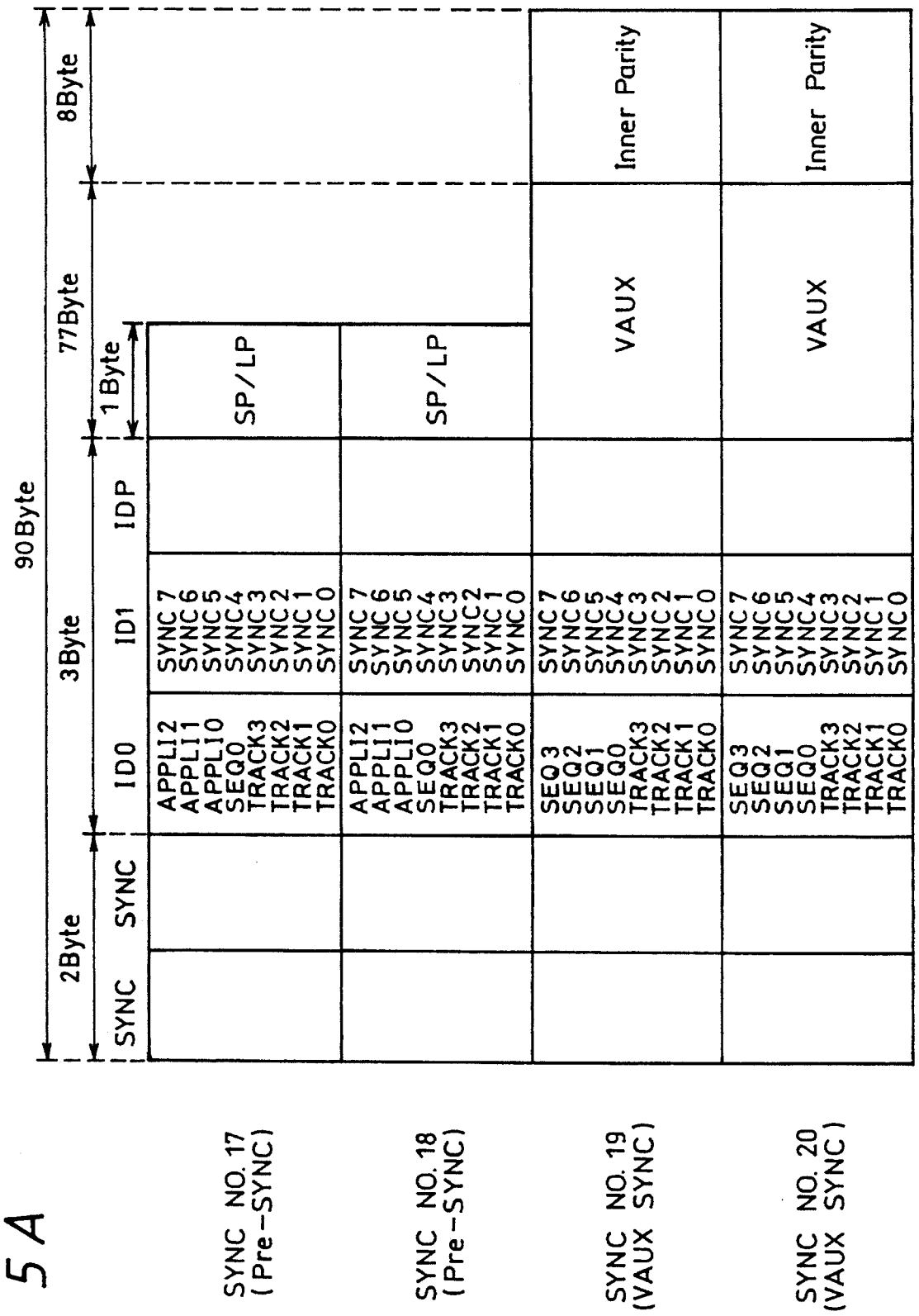
FIG. 5 is a diagram showing a recording format of a video sector of a video area of the embodiment of FIG. 1.

Referring to FIG. 1E, the video area is shown and includes a pre-amble sector, which includes run-up and pre-sync regions, a video sector, and a post-amble sector, which includes post-sync and guard area regions. Turning now to FIG. 5, the video sector of the video area is shown and includes 152 sync blocks. As in the audio sector, each sync block includes 2 bytes of sync data and 3 bytes of ID data. Pre-sync blocks 17 and 18 and post-sync block 168 are structured similar to the pre- and post-sync blocks of the audio sector. Sync block numbers 19, 20 and 156 are VAUX sync blocks—referred to as alpha, beta and gamma, respectively—and store accompanying information. Sync block numbers 21 to 155 are video sync blocks and include video data as well as inner parity data. Sync block numbers 157–167 are parity sync blocks and include both outer parity data and inner parity data.

Figure 6A:
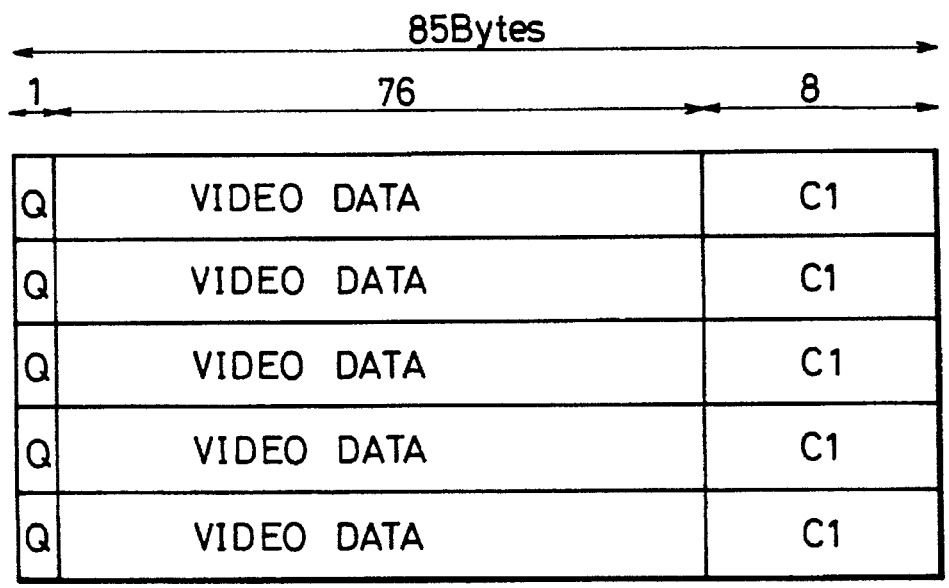
FIGS. 6A–6B are diagrams showing in detail a plurality of video sync blocks of the video sector of FIG. 5.
Figure 6B:
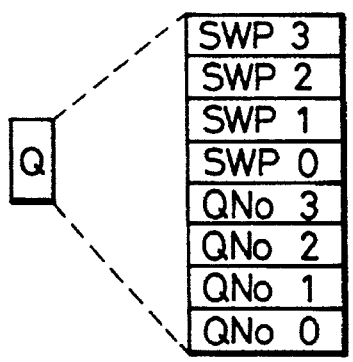

FIG. 6 further illustrates a buffering unit formed of five sync blocks, each comprised of the 77 bytes of video data and 8 bytes of inner parity data. The first byte of the video data is a Q data byte in which quantization data is stored. The 8 bits of the Q data byte are shown in further detail in FIG. 6B. The lower 4 bits of Q data, QNo0 to QNo3, represent quantization table numbers. The upper 4 bits SWP0 to SWP3 represent change-over points (switching points) of the quantization table numbers. A given quantization table number is used by one buffering unit and is repeated five times in the five sync block buffering unit, thus reducing the possibility of an error. The switching point data has a value associated with each sync block. Furthermore, the value [1111] is assigned to both the upper 4 bits and the lower 4 bits to represent an error code and the value [1110] represents an overflow code. Following the Q byte, are 76 bytes of video data.

Figure 1F:
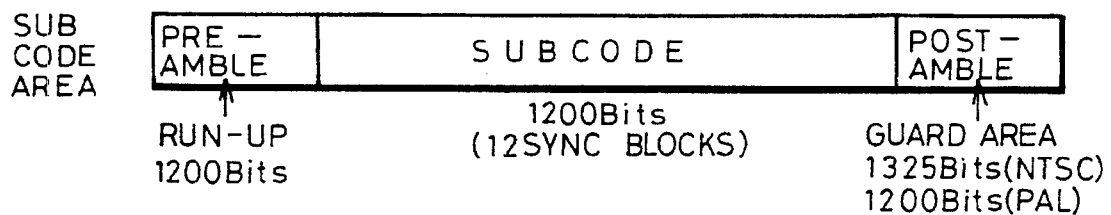
Figure 8:
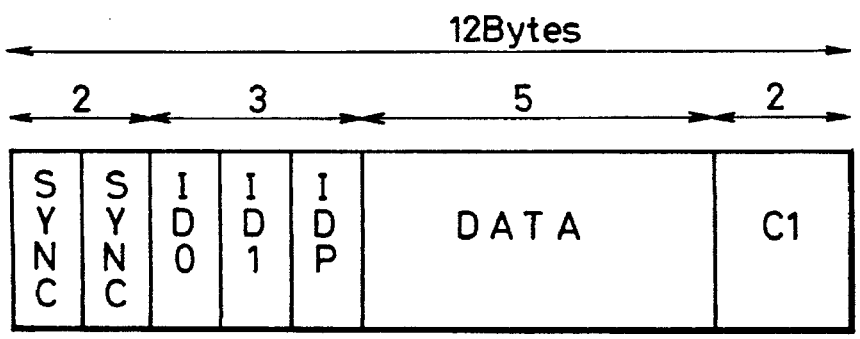
FIG. 8 is a diagram showing in further detail a sync block of the subcode sector of FIG. 7.

As shown in FIG. 1F, the subcode area includes a pre-amble sector, a subcode sector, and a post-amble sector. Referring now to FIG. 7, the format of the subcode sector is shown in detail and includes 12 sync blocks, 0–11. Each sync block includes 2 bytes of sync data, 3 bytes of ID data, 5 bytes of subcode data, and 2 bytes of parity data. Divided among the ID0 and ID1 bytes of a trio of such sync blocks is the absolute track number which consists of 23 bits and provides a track identification which can be used during high speed searching of a tape. This absolute track identification is repeated four times in the subcode sector. Application data bits AP3 are stored in the ID0 byte of sync blocks 0, 6 and 11. Also present in the ID0 byte of all sync blocks is frame identification bit FR indicating whether the track is part of a first half of a video frame (FR=1) or part of a second half of a video frame (FR-0). Also present in the ID1 byte of sync blocks 0, 3, 6 and 9 is a blank flag (BF) which is used to indicate whether or not a discontinuity exists before the current absolute track number (i.e. whether blank tape precedes this track) therefore indicating that the amount of tape remaining cannot be accurately determined from the absolute track number. FIG. 8 schematically shows one subcode sync block.

According to the present embodiment, the ID0 and ID1 bytes of the audio, video and subcode sectors never take the value [11111111] and therefore, when an error appears in an ID0 or ID1 byte of a sync block and that error cannot be removed completely by error correction techniques, the values of the ID0 or ID1 byte for that sync block are replaced with [11111111], thereby providing readily detectable error data.

Figures 9A, 9B:
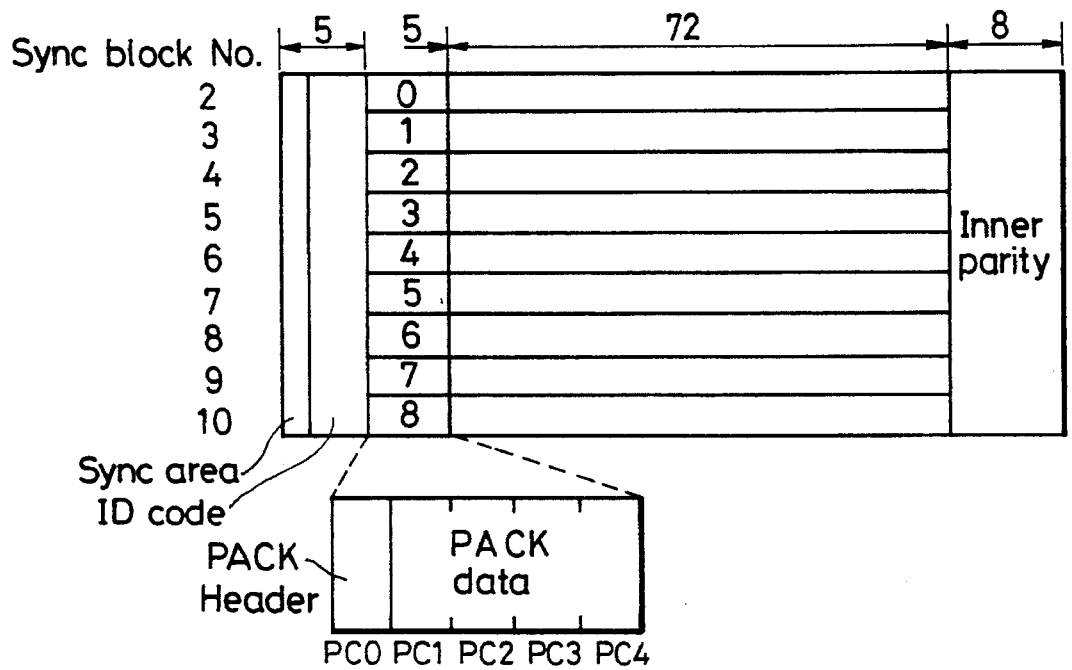
FIGS. 9A–9B are diagrams showing the pack data structure of the AAUX regions of the audio sector shown in FIG. 3.

Turning now to FIG. 9, the AAUX region of the audio sector of the audio area is shown in further detail. As shown in FIG. 9A, the 5 bytes which constitute the AAUX region form a "pack". The first byte, PC0, serves as a pack header and the remaining bytes, PC1–PC4, serve as pack data.

FIG. 9B shows the audio pack data structure of one frame. In a frame consisting of 10 tracks, there is a total of 90 AAUX regions, 9 per track. Of the 9 AAUX regions in each track, 6 are considered main AAUX regions and the remaining are optional regions. As shown in FIG. 9B, the numbered regions are the main regions and include pack header data, which will be defined subsequently.

Figure 10:
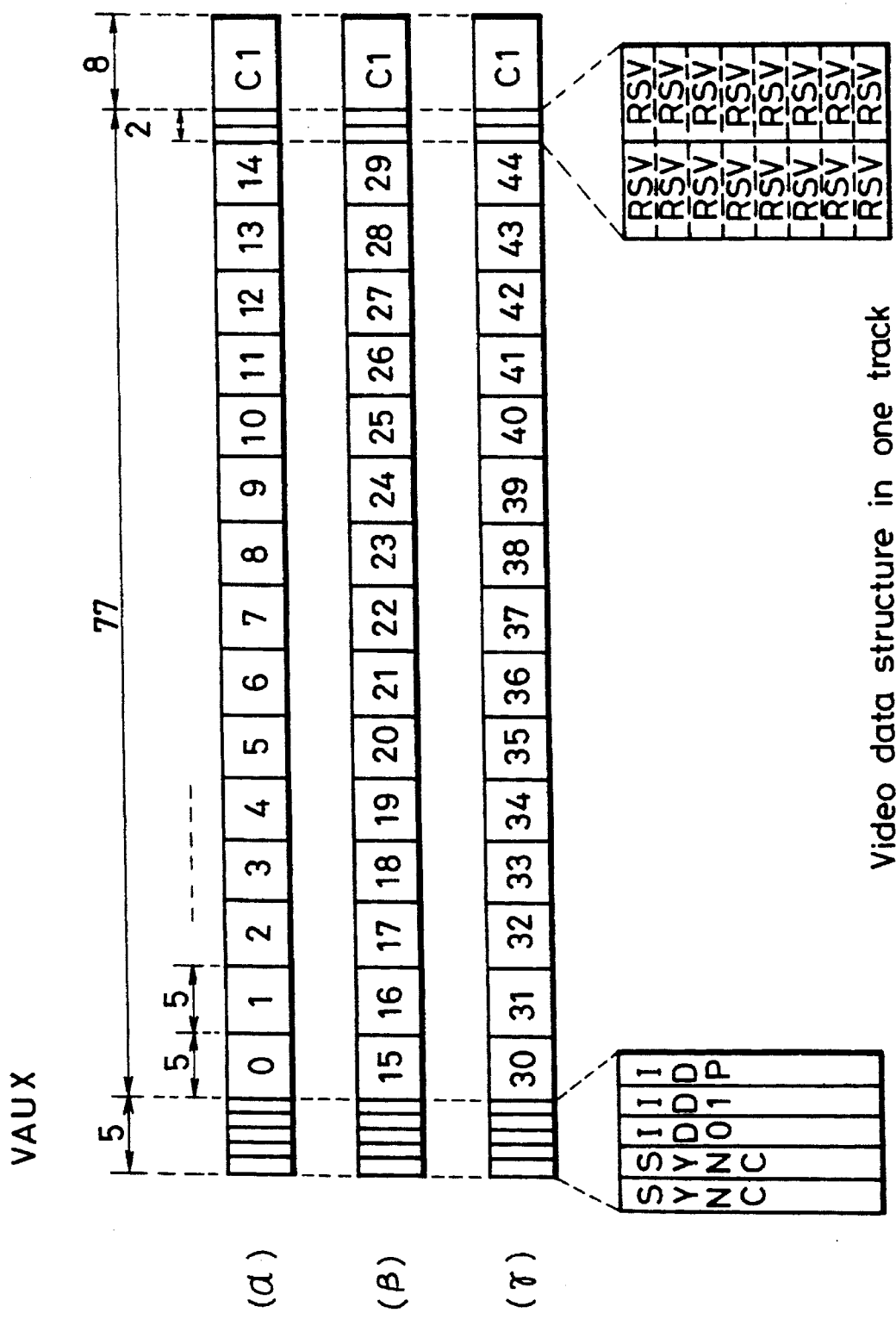
FIG. 10 is a diagram showing in further detail the data structure of the VAUX region of the video sector shown in FIG. 5.
Figure 11:
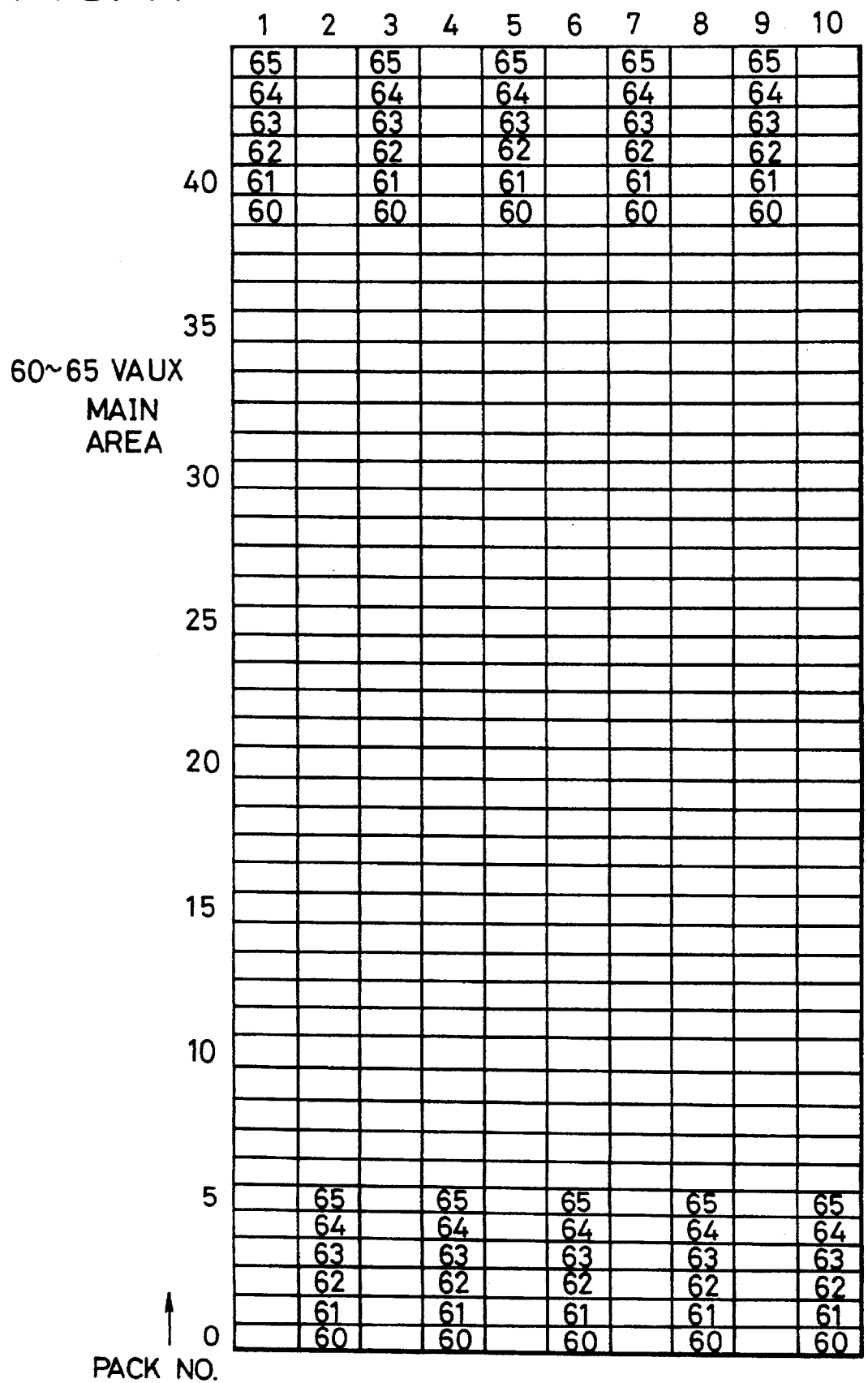
FIG. 11 is a diagram showing the main data regions and the optional data regions of the VAUX region of the video sector.

Referring now to FIG. 10, the 3 VAUX sync blocks of the video sector of the video area are shown. Each VAUX sync block includes 15 5-byte packs, for a total of 45 packs per track. FIG. 11 shows the VAUX regions for all ten tracks of one frame are shown. As described above regarding the AAUX regions, the VAUX regions are also divided into main regions and optional regions.

The numbered regions of FIG. 11 are the main regions.

Figure 12A:
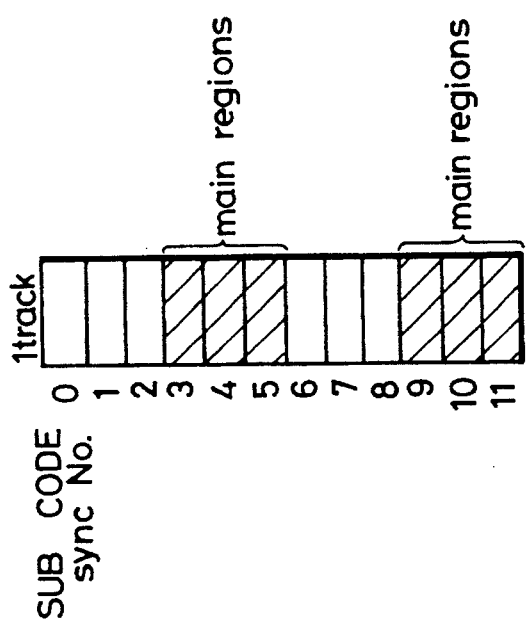
FIGS. 12A–12B are diagrams respectively showing a first and a second embodiment of the main data regions and the optional data regions of the subcode data regions of the subcode sector.

Turning now to FIG. 12, the subcode data region of each of the subcode sectors is comprised of a 5-byte pack. In one embodiment, the subcode data regions in sync blocks 3, 4, 5, 9, 10, and 11 of every subcode sector in a frame are main regions while the subcode data regions of the remaining sync blocks in the frame are optional regions, as shown in FIG. 12A.

Figure 12B:
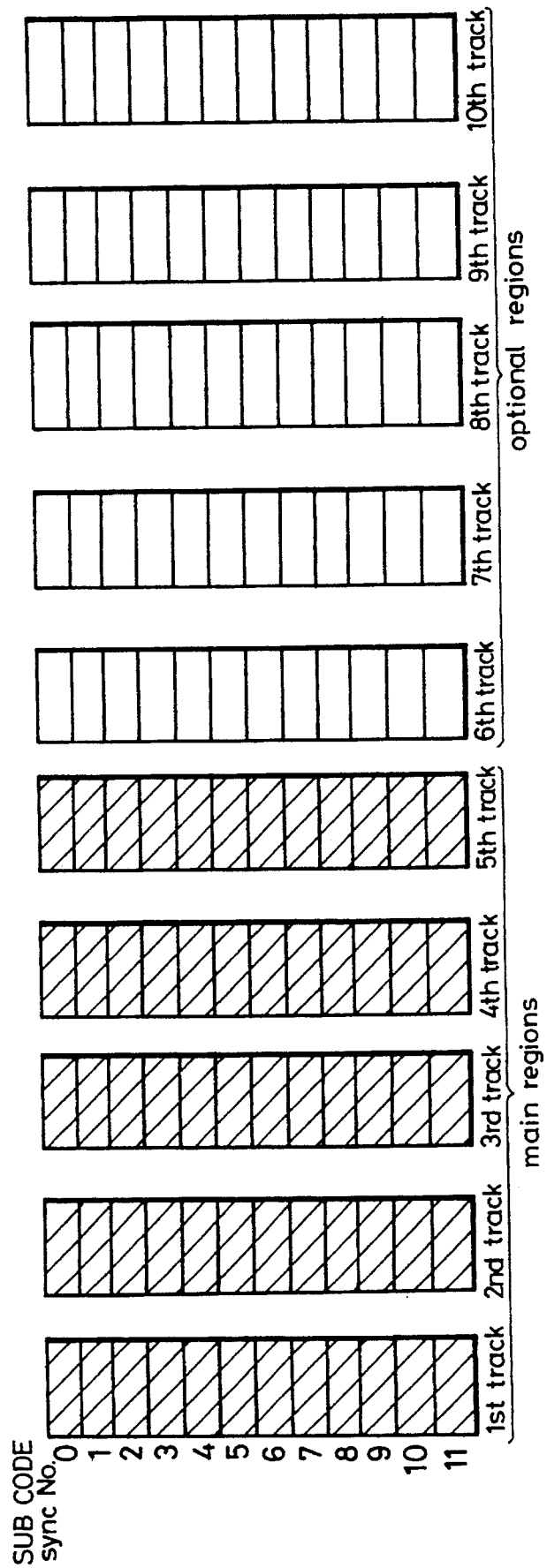

Alternatively, instead of identifying some of the subcode data regions of a sector as main regions and others as optional regions, the entire subcode sector is identified as either comprising main regions or comprising optional regions. As shown in FIG. 12B, in the NTSC format, all subcode data regions of all sync blocks in the first five tracks of a frame are main regions, whereas all subcode data regions of the remaining five tracks are optional regions.

In the main region of the AAUX, VAUX and subcode data, there is recorded information regarding basic data common to all tapes. The respective packs forming the main region store information regarding these particular data items.

In the AAUX region, the main regions store data regarding the recording signal source, the recording date, the recording time or the like.

In the main region of the VAUX region, there can be stored CLOSED CAPTION information for handicapped viewers, in addition to data representing recording time or other data similar to that of the main region of the AAUX region.

In the main region of the subcode area, there can be stored a time code representing title, chapter starting point data, or a part number, as well as the recording date data and the recording time data, as described above.

The basic data recorded in the main regions of the AAUX and VAUX regions are repeatedly recorded such that, as shown in FIGS. 9 and 11, the data is stored in every track and alternates between the recording head trace starting side and the recording head trace ending side of a track. Also, in the main region within the subcode sector, this basic data are repeatedly recorded in the 4th to 6th sync blocks and in the 10th to 12th sync blocks. Therefore, data is not dropped out even if the tape is scratched.

Furthermore, since the basic data are recorded by both the odd-numbered track recording head and the even-numbered track recording head, data drop out due to head clogging is prevented.

In addition to the basic data recorded in the main regions, accompanying information can be written into the optional regions such as, for example, character broadcast signal data, television signal data normally provided within the vertical blanking period or within the effective scanning period, computer graphics data, and the like.

FIG. 13 shows the structures for different kinds of packs, as will now be described in detail. Each pack includes 5 bytes of data. The first byte (PC0) is assigned to item data (ITEM) indicative of the content of the succeeding data. The format of the succeeding 4 bytes (PC1 to PC4) is determined based on the item data.

The item data is divided into upper 4-bit data and lower 4-bit data. The upper 4-bit data identifies what is referred to as a "large" item, and the lower 4-bit data identifies what is referred to as a "small" item. The upper 4bit "large" item and the lower 4-bit "small" item define the format and content of the succeeding data. There are at most 16 "large" items, and for each "large" item, there are at most 16 "small" items.

The large items identified by the upper 4 bits of the item data are, as shown in FIG. 14, control [0000], title [0001], chapter [0010], part [0011], program [0100], camera [0111], line [1000], video auxiliary data [0110], audio auxiliary data [0111] and soft mode [1111]. Large items [0101] and [1001] to [1110] are reserved items for future applications.

Because the contents of the data packs can be determined by reading the pack header, the position at which the pack is recorded can be set arbitrarily. Furthermore, because the presence or absence of an error can be represented by the pack data, as will be described later, errors can be detected and avoided.

The various packs that are formed by the large items and their respective small items are shown in FIG. 15 and are further described below.

(1) Control Large Item [0000].

This large item includes as small items a tape ID [0000], tape length [0001], timer recording designated date [0010], timer recording starting and ending time [0011], recording start position [0101], topic/page header [0111], control text header [1000], and control text [1001].

In a pack containing the tape ID small item [0000], there are recorded application data -for defining whether the tape is to be used in a VTR, or for computer data storage, etc.-as well as tape characteristic data, and tape manufacturer codes or the like, as shown in FIG. 16(1). In a pack containing the tape length small item [0001], there are included a tape length or its equivalent binary value representing the number of tracks that may be recorded in this tape length, as shown in FIG. 16(2).

In a pack containing the timer recording designated date small item [0010], there are recorded mode data, such as SP/LP data, as well as day, month and year data, as shown in FIG. 16(3). In a pack containing the timer recording starting and ending time small item [0011], there are included the hour and minute of the record starting and ending times, as shown in FIG. 16(4). In a pack containing the recording starting position small item [0101], there are recorded the track number of the recording starting position, as shown in FIG. 16(5). Using this pack, a recording can be started from a designated tape position as part of a time activated recording mode.

In a pack containing the topic/page header small item [0111], there are recorded various control information of text data such as the kind of language in which the text information is expressed (language tag), the type of text information (topic tag), last page unit number (LPU), display character number of one page (DM), existence or. absence of scroll display (SCRL), scroll direction (H/V), picture screen initialization flag (INIT), raster color designation, page unit number or the like, as shown in FIG. 16(6).

In a pack containing the control text header small item [1000], there are included character codes of text data to be recorded, and text type (attributes of text data, such as the program name, broadcast station name, dot pattern data, or codes for identifying other attributes), and the PN flag, as shown in FIG. 16(7). The PN flag determines whether the number of packs or text code TTNO of the PC3 byte indicates a number of packs of succeeding text (PN=0) or a number of bytes of succeeding text (PN=1).

When ordinary text data is recorded (PN=0), as in a AAUX or VAUX region or as in a subcode sector, text packs corresponding in number to the value of TTNO are stored after the control text header pack. Because one byte of pack header data is required for every four bytes of text data, 20% of the total text data area is not used for text data. When PN=1, as in a cassette having a small capacity memory IC, data is instead stored continuously in the memory IC from the end of the control text header pack, thus more efficiently utilizing the memory IC. Because the number of bytes of text is stored in the control text header pack, the location of any succeeding pack can be readily determined.

In a pack containing the control text small item [1001], there are recorded 4 bytes of text data, such as the text data described above, as shown in FIG. 16(8).

(2) Title large item [0001].

In this large item, there are included small items such as total time [0000], remaining time [0001], time code [0011], binary group [0100], title text header [1000], and title text [1001].

In a pack containing the total time small item [0000], the total playback time of the recording is represented, as shown in FIG. 17(1). Similarly, in the pack containing the remaining time small item [0001], the remaining time to the end of the recording is represented.

In a pack containing the time code small item [0011], the time code data in hours, minutes, seconds, and frames is recorded, as shown in FIG. 17(3). (In this embodiment, a professional standard SMPT/EBU system time code is employed.) In a pack containing the binary group small item [0100], binary time code data is recorded, as shown in FIG. 17(4).

(3) Large Items [0010] to [0100].

For the chapter large item [0010], the small items provided include total time [0000], remaining time [0001], time code [0011], binary group [0100], chapter text header [1000], and chapter text [1001]. The packs representing these items are stored in a format similar to that of title large item [0001].

For the part large item [0011], the small items included therein are total time [0000], remaining time [0001], time code [0011], binary group [0100], part text header [1000], and part text [1001], whose packs appear in a format similar to that of the title large item [0001].

For the program large item [0100], small items therein include total time [0000], remaining time [0001], time code [0011], binary group [0100], program text header [1000], program text [1001] and the like whose packs appear in a format similar to that of the title large item [0001].

Accordingly, the respective small items included in the large items of title [0001], chapter [0010], part [0011], and program [0100] share a common arrangement. Of these large items, title [0001] is used in both a pre-recorded video tape, as may be distributed by a program supplier, and in a tape recorded by the user, whereas chapter [0010] and part [0011] are used exclusively in a tape recorded by a user.

(4) Line Large Item [1000].

In the line large item, there are provided small items such as line header [0000], Y (luminance) [0001], R-Y (color difference) [0010], B-Y (color difference) [0011], R [0101], G [0110], and B [0111].

The data included in the packs of this large item are derived from sampling an arbitrary line within a vertical blanking period or within an effective scanning period of the television signal. Alternatively, there can be recorded sampling data of the video signal other than the television signal.

In a pack containing the line header small item [0000], the (binary) number of sampled horizontal line periods, bit B/W for discriminating color/black and white, code CLF indicative of color frame, flag EN for determining whether the color frame code CLF contains valid data, total data sampled (binary) TDS of one horizontal line, code fr indicative of sampling frequency and code QU indicative of quantization bit number are provided, as shown in FIG. 18(1).

Code fr indicates a frequency of 13.5 MHz when the code is set to [0], 27.0 MHz when fr is set to [1], 6.75 when fr is set to [2], 1.35 MHz when fr is set to [3], 74.25 when fr is set to [4] and 37.125 MHz when fr is set to [5], respectively. The code QU indicates 2 bits when set to [0], 4 bits when QU is set to [1] and 8 bits when QU is set to [2], respectively. The optional code B/W is set to [0] for a color mode and is set to [1] for a black and white mode. Only one bit of color of the frame code CLF is utilized for an NTSC video signal and issued to instruct two color frames with values [0] or [1]. For a PAL video signal, 2 bits of the frame code CLF are used to instruct four color frames having values [00] to [11]. The flag EN makes the frame code CLF valid when set to [1].

Following the line header small item pack [0000] of FIG. 18(1), are packs of small items Y [0001], R-Y [0010], B-Y [0011], R [0101], G [0110] and B [0111]. Each of these packs contains 4 bytes of coded sampling data of either Y signal, R-Y signal, B-Y signal, R signal, G signal or B signal, respectively, as shown in FIGS. 18(2)–18(7). FIG. 19 shows an example of video signal data stored using the line large item packs of FIGS. 18(1)–18(7).

The following signals are recorded by these line packs:

a) Information stored within a television signal vertical blanking period.

Included in information transmitted from the broadcasting station are signals used by the broadcasting station, such as a teletext signal, a vertical interval test signal (VITS signal), a vertical interval reference (VIR) signal, CLOSED CAPTION information for handicapped viewers, a VPT signal or PCD signal for reserving automatic recording in a VTR, and the like. In particular, the present embodiment of the digital VTR permits only a video signal in the effective scanning period to be recorded and not information signals such as those signals which are present during the vertical blanking period. When the present compression system digital VTR is used for professional purposes, information transmitted during the vertical blanking period must be recorded by some suitable method and the original television signal, including information signals present during the vertical blanking period, must also be restored completely upon reproduction. The line packs provide such a medium for storage and reproduction.

Additionally, if a VITS signal, VIR signal or the like is recorded once in the first frame—instead of repeatedly recording the signal in every frame—and, upon reproduction, the signals are repeatedly inserted into respective frames of the reproduced video signal, then less tape is consumed.

In addition to the above-mentioned information, a dubbing preventing signal, a "soft tape" identifying code (VBID), a video interval time code (VITC) for use in professional applications, various control information and parameter information recorded by a medical VTR or the like can be present during the vertical blanking period.

b) Information stored during a vertical blanking period and also during a television signal scanning period.

Figure 20:
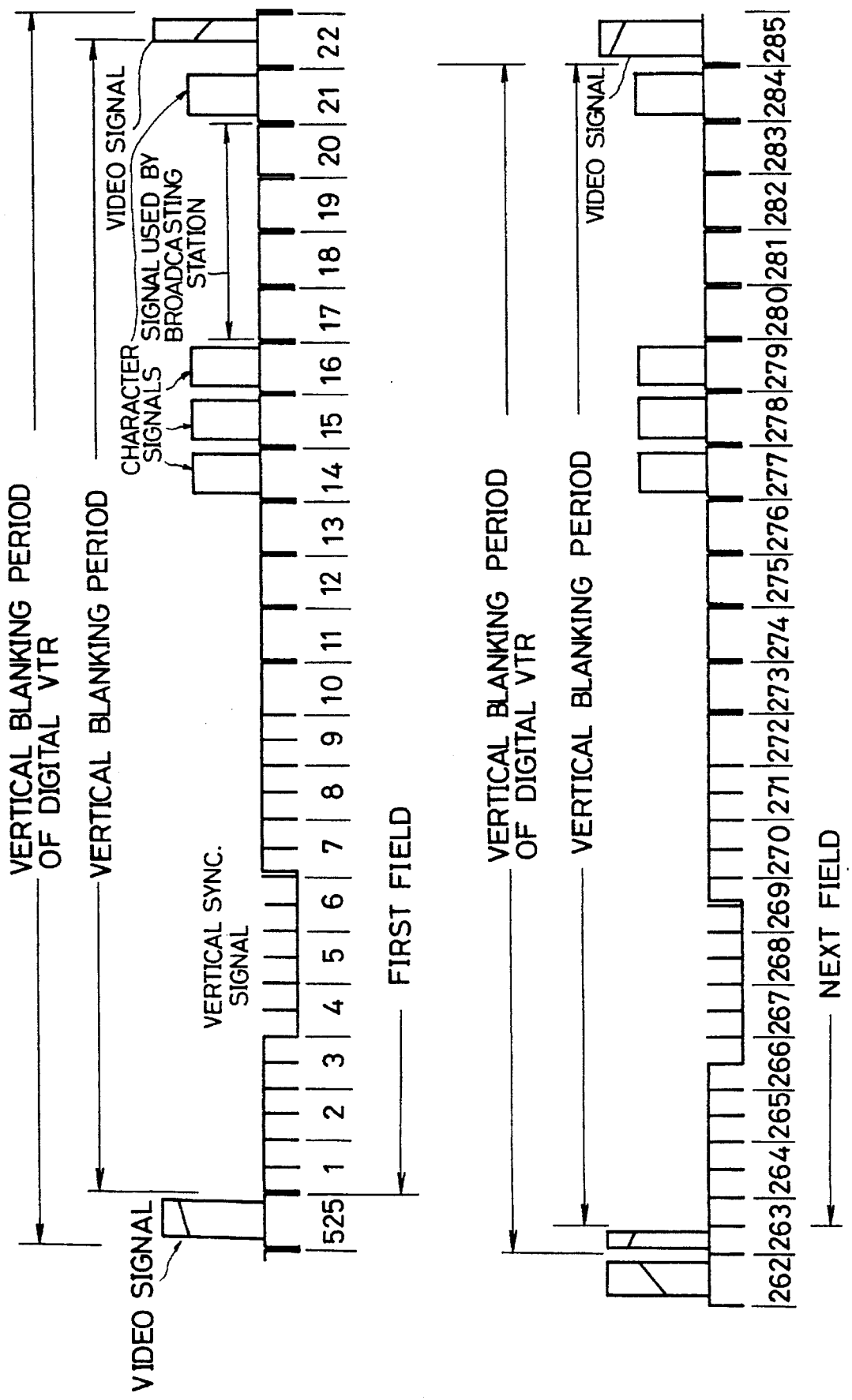
FIG. 20 is a diagram showing the vertical blanking period recorded by an embodiment of the digital VTR of the present invention and showing the vertical blanking period of a broadcast television signal.

The vertical blanking period of a television signal (which is not recorded by the digital VTR of the present invention) and the vertical retrace period defined by the television signal are not coincident. As shown in FIG. 20, the VTR vertical blanking period is wider than the NTSC vertical blanking period. Therefore, when the digital VTR of the present invention is used for professional applications, not only must the vertical blanking period information be recorded and restored, but also video signals at lines 22H, 263H and 525H must be recorded and restored. Such information can be stored in a line pack.

c) Video signals within the television signal scanning period.

A video signal of an arbitrary horizontal line within the scanning period can be sampled and recorded in line packs. Upon reproduction, the recorded signal stored in the line packs can be written to a memory and then combined with a regular video signal and displayed, for example, as a video special effect.

When this type of recording is made, luminance data is stored in the line Y pack of FIG. 18(2). If bit B/W of Fig. 18(1) set to 1, indicating that the video signal is a black and white signal, then only line Y packs are needed to reproduce the original signal. However, if bit B/W is set to 0, then the video signal is a color signal and in order to fully reproduce the signal, the line R-Y pack and the line B-Y pack, shown in FIGS. 18(3) and 18(4), are also stored with the line Y pack at a sampling rate of 4:1:1.

d) Information other than the television signal.

By properly selecting the sampling frequency and the quantization bit number of the line packs for recording R, G, B signals, as shown in FIGS. 18(5), 18(6) and 18(7), color video information -such as computer graphics video information—may be recorded and displayed on a television picture screen.

(5) Video Auxiliary Data [0110] and Audio Auxiliary Data [0101] Large items.

The video auxiliary data [0110] and audio auxiliary data [0101] large items are provided with small items such as recording signal source [0000], recording date [0010], recording time [0011], binary group [0100], text header [1000], text [1001]and the like.

The packs containing the video auxiliary data large items [0110] are illustrated in FIGS. 21(1) to 21(4). In the pack containing the recording signal source small item [0000], there are included data such as a two digit recorded television channel number, type of tuners and the like. In the pack containing recording date small item [0010], there are provided data such as time period, day, week, month, year and the like. In the pack containing the recording time small item [0011], binary recording time data are provided.

In the video auxiliary data packs containing the text header [1000] and text [1001] small items, the format of these small items is similar to those of FIGS. 16(6) and 16(7).

The packs containing the audio auxiliary data large item [0111], are provided with respective ones of small items such as recording signal source [0000], recording date [0010], recording time [0011], binary group [0100], text header [1000], text [1001] and the like; and these packs are formatted in a manner similar to the video auxiliary data large item [0110].

(6) Other Large Items.

Figures 22, 23:
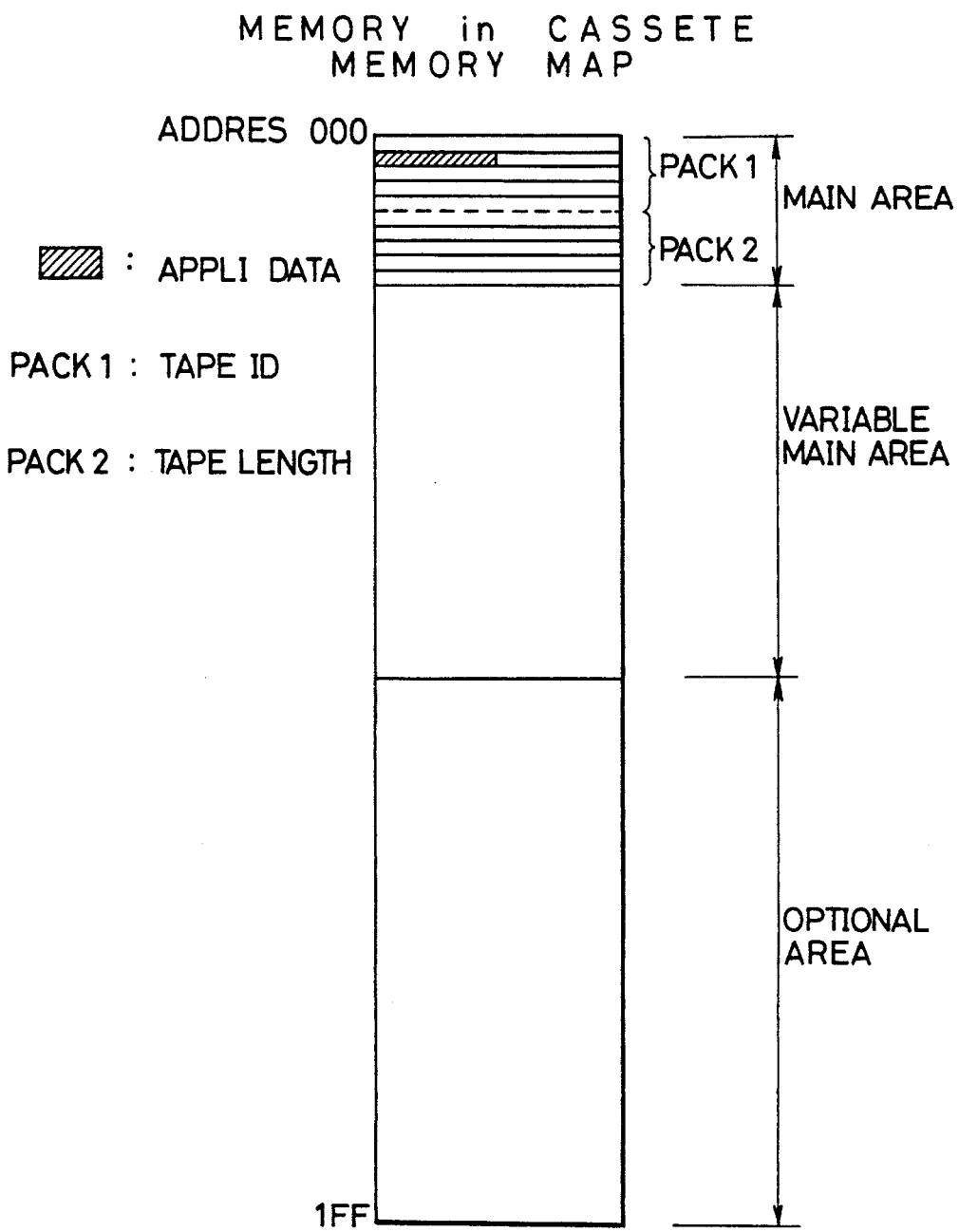
FIG. 22 is a diagram showing a pack of the "soft mode" large item.
FIG. 23 is a diagram showing the memory map of a memory IC in the cassette device used with the present invention.

The soft mode large item [1111] has a "maker" code small item [0000], shown in FIG. 22, and other items that may be used by providers of pre-recorded programs tapes (referred to as "software" or "soft tapes"). Furthermore, the small item [1111] is defined to indicate that the soft mode pack has no information.

Using the pack structure of the present embodiment, because the data structure is a common structure to all packs, the software needed for recording and reproducing data is common for all large items and thus the processing of data is simplified. Furthermore, because the timing of recording and reproducing is constant, extra memory need not be provided. Hence, when new recording or reproducing equipment is developed, the software therefor can easily be adapted merely by defining additional packs.

With the above pack structure, when an error occurs, such as in the playback mode, the next pack can be read out without a large amount of data being destroyed by propagation of the error.

There has been proposed a tape cassette formed with a circuit board having a memory IC mounted within or on the tape cassette itself. This, of course, is in addition to the recording medium. In accordance with this tape cassette having a memory IC (MIC) formed therewith, when the cassette is loaded into a VTR, data previously written to the memory IC is read out to assist the recording and reproduction. This is described in Japanese patent applications Nos. 4-165444 and 4-287875.

FIG. 23 shows data written to the memory IC in the above-described pack structure. In this pack structure the address of the memory IC is contained as the small item [0000] in the control large item [0000], as is the pack representing tape length [0001]. Item data [00000000] as indicated on the first byte (PC0) of the first pack (FIG. 16(1)), also serves as an identification code to identify the presence or absence of the memory IC in this cassette. Also, application data are provided on the upper 4 bits of the second byte (PC1) of the first pack of this control item.

Following the first two fixed packs, data such as TOC (table of contents) or the like is written to construct a variable length main region. When text is written in this memory IC, as described above (FIGS. 16(7) and 16(8)), the PN flag in the text header is set to [1] and memory area is saved. A break in the continuous text data can be detected using the number of bytes as written in the control text header pack. Thus, even when a reproduction error occurs, the next pack can be read out and is not destroyed by propagation of error or the like.

Following the variable length main region, there can be written large items Such as control [0000], title [0001], chapter [0010], part [0011], program [0100], line [0101], video auxiliary data [0110], audio auxiliary data [0111], soft mode [1111] or the like, thus forming an optional region.

The optional region is comprised of a common optional region and a maker optional region. Text data, for example, is recorded in the common optional region. Packs of the soft mode large item [1111] and of the maker code small item [0000] are provided in the maker optional region. Following these packs, are data provided by each program distributor. The content of the common optional region is written initially, and the content of the maker optional region is written thereafter.

Accordingly, if the maker code [0000] pack is corrupted, the pack that has a common content before the maker code pack and following the maker code pack nevertheless indicate the contents associated with each maker pack and can be retrieved accurately.

Therefore, the choice of contents written or recorded is greatly increased using the packs recorded in the audio signal data, in the video signal data, in the sub code area or in the memory IC.

(8) Application Data.

Application data are provided in the TIA sector, in the AAUX sector of the audio area, in the VAUX sector of the video area and in the subcode sector as well as in the MIC (memory in cassette). This application data indicate the contents of the respective areas so that the contents can be decoded and processed.

The various application data have a hierarchal structure with the application data provided in the ITI area having the highest rank. When the value of the ITI application data is [0000], the track format is that of the present embodiment and in accordance with the formats shown in FIGS. 2 to 22. If the value of the ITI application data is set to another value, the tracks are utilized in accordance with the format defined by that value.

Application data provided in the MIC of the tape cassette controls all areas of the MIC. The application data of the MIC are of the same rank as the ITI application data.

Application data provided in the AAUX of the audio sector, the VAUX of the video sector, and the subcode sector are subordinate to those of the ITI area and the MIC. Therefore, when the application data of the ITI area is [0000], other types of data can be stored and processed in the audio, video and subcode areas. For example, video and audio data of a video game may be stored in the video and audio areas in the same format as the aforedescribed consumer digital VTR and the game software may be stored in the subcode area.

A further example of application data that can be provided in the AAUX, the VAUX or subcode sectors is information regarding permission to copy a program. A signal transmitted during a vertical blanking interval can incorporate information regarding the copyright of the program transmitted. This information is incorporated into a pack and used to prevent copying or dubbing of a program or to restrict the number of times a program may be copied.

In the digital VTR of the present embodiment, the application data provided in the VAUX sector of the video area is processed at every compression unit. When in the variable speed playback mode, since the reproducing head may irregularly enter other compression units, more than one set of application data must be provided within each compression unit to assure proper detection.

Because the audio signal and the video signal are processed using digital dubbing, errors can be omitted by utilizing packs. If digital dubbing is carried out using a discharge system, then the data transmitted are, for example, ID0, ID1 and the data portions excluding the 2-byte synchronizing data, IDP, inner and outer parities. Thus, it is not advantageous to write on the tape a data value to indicate that data is erroneous.

Therefore, according to the present embodiment, an item code [11111111], indicating that no useful information is stored, is utilized to indicate an error. More specifically, when an error that cannot be corrected occurs in the data of a pack, the pack header item code is set to [11111111], indicating that the pack has no useful information. If such a pack is dubbed, the receiving side (or re-recorder) can determine that the pack is an error pack, the pack is not copied and thus the error in the pack data is not copied.

Figure 24:
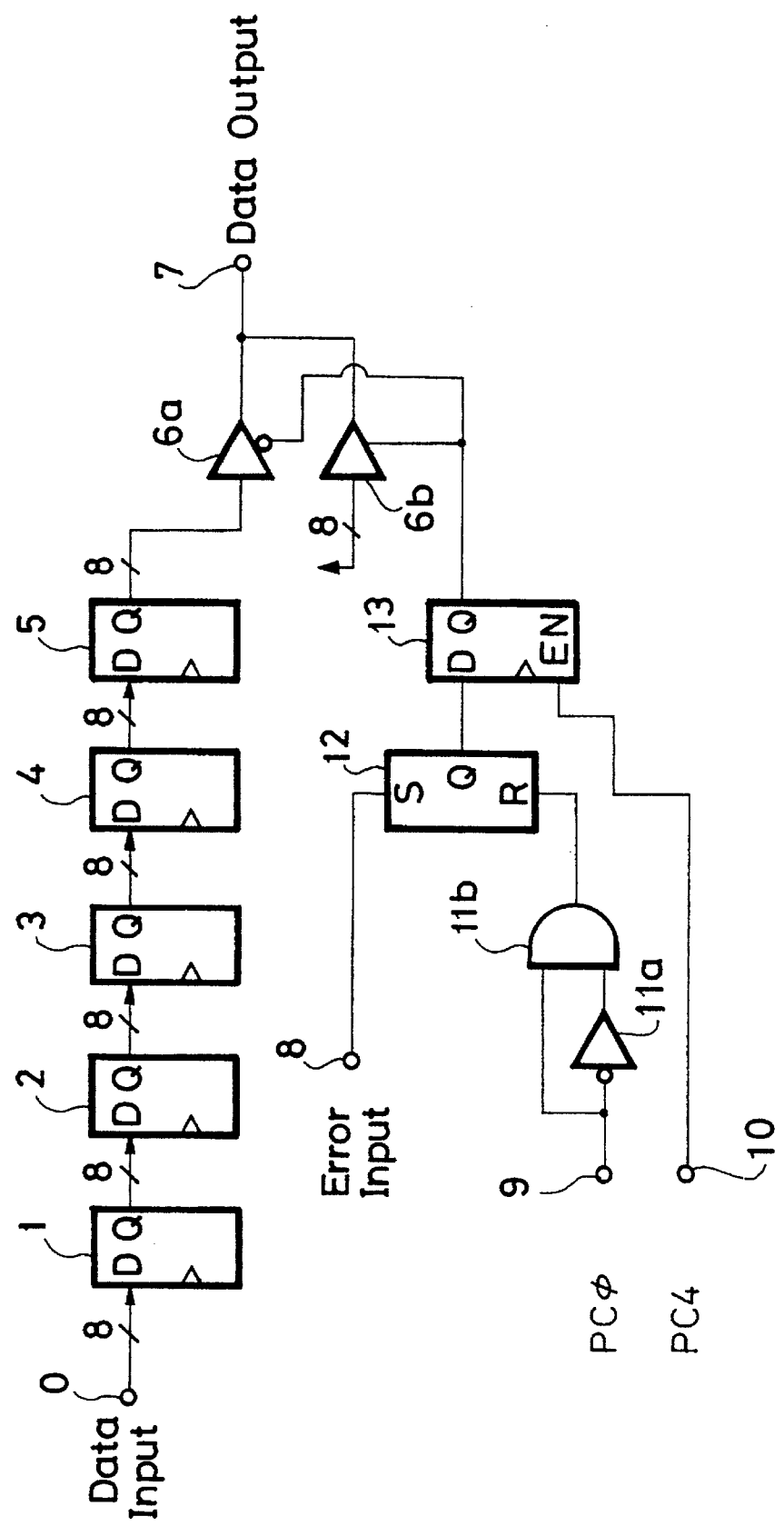
FIG. 24 is a schematic diagram showing a circuit for digital dubbing and error correction.

FIG. 24 shows an embodiment of a circuit using D-type flip-flops of 5 bytes or less for the above-mentioned digital dubbing. 8-bit data is input to an input terminal 0 and is delayed by one pack by 8-bit D-type flip-flops 1, 2, 3, 4 and 5. Any error is input through an input terminal 8 to an RS-type flip-flop 12 to set the same. RS-type flip-flop 12 is supplied with a first pack PC0 slot signal from an input terminal 9 and is reset at every pack by a differentiating circuit formed of an invertor 11a and gate 11b.

A D-type flip-flop 13, having enable terminal EN, is made operative by a PC4 slot signal supplied thereto from input terminal 10 to activate switches 6a, 6b during a time period of 5 bytes. When an error occurs, switch 6b is made operative and 8-bit data [11111111] is output from output terminal 7.

The ID portions of the respective data areas are arranged as shown in FIGS. 2, 3, 5 or 7. When an error that could not be fully removed by an error correction circuit appears in the ID0 or ID1 data, ID0 and ID1 are replaced with [11111111] to indicate such error. Because the value of the application data in the ID portions of the respective areas is never [1111], data that is represented by [11111111] is treated as application data and is recognized as an error.

Other errors that are present in the actual video signal and the actual audio signal are replaced with other error codes. For example, in an embodiment of a digital recording and reproducing apparatus in which the video signal is processed by a DCT compression system and the audio signal is processed in a 48 kHz and 15-bit sampling system, a DC component and an AC component of the video signal are replaced with [011111111] and [111101], and the audio signal is replaced with [1111111111111111].

Figure 25A:
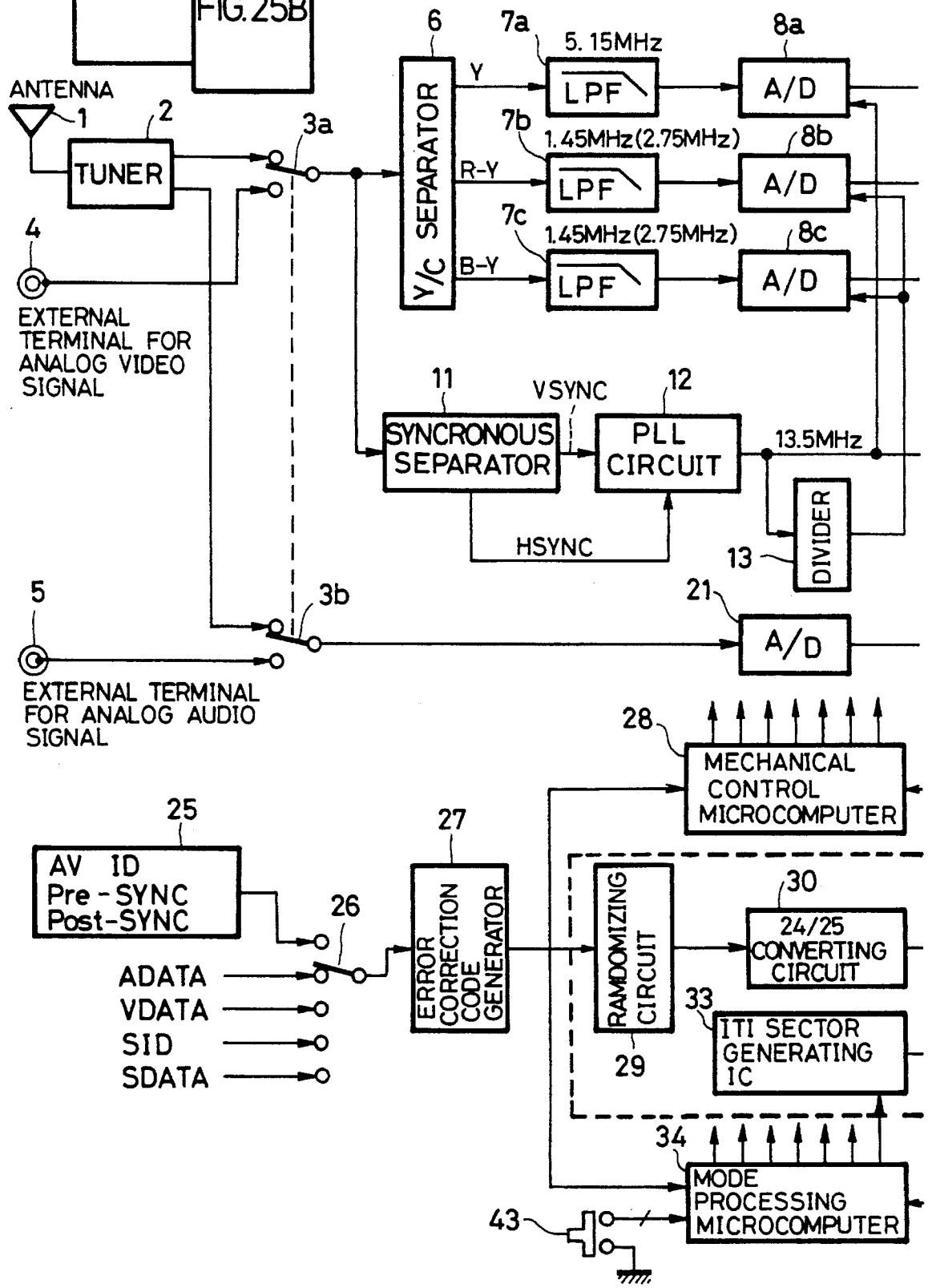
FIG. 25 is a block diagram showing a first embodiment of a recording section for a digital VCR in accordance with this invention.
Figure 25B:
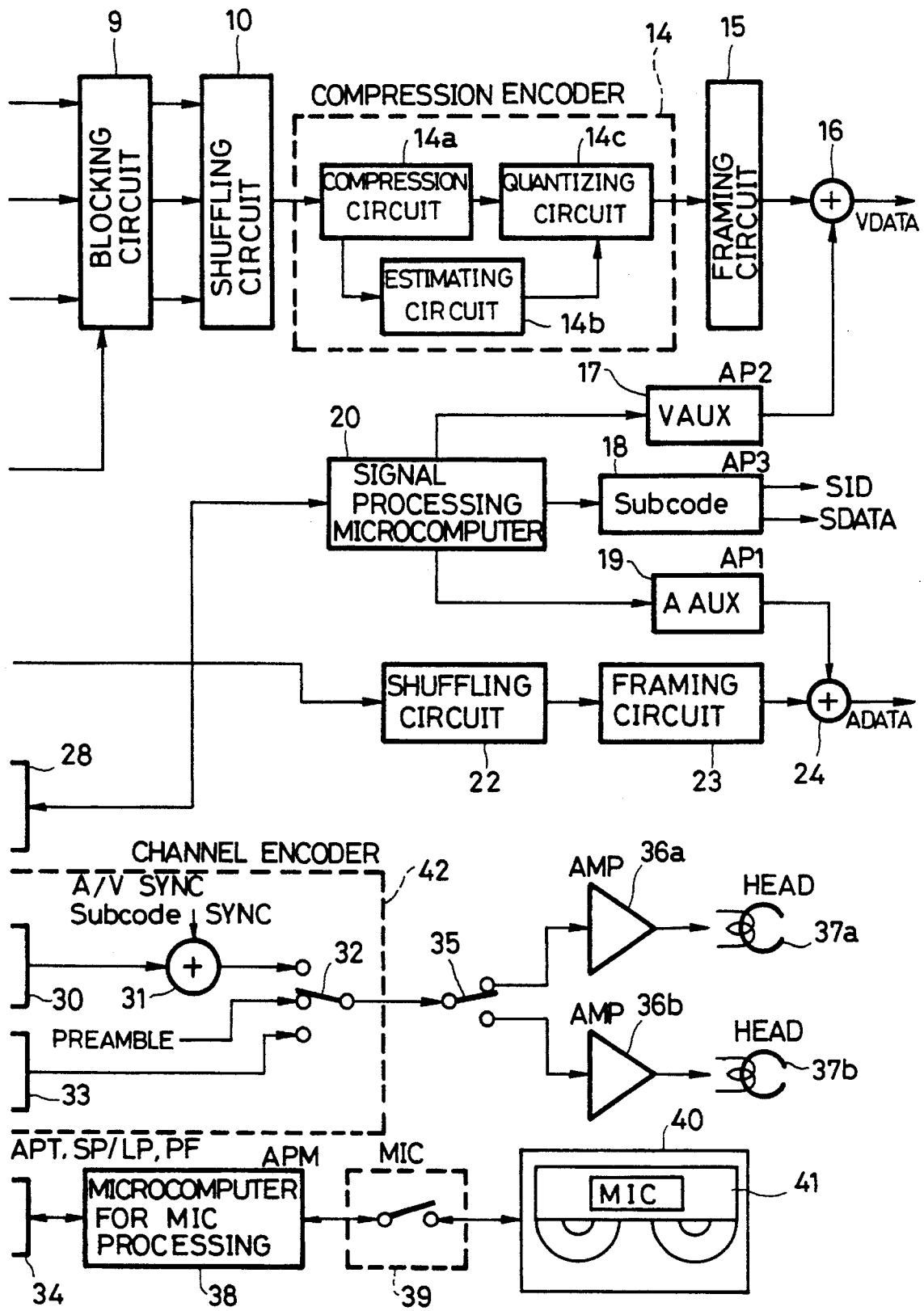

Referring now to FIG. 25, a recording apparatus which includes an embodiment of the present invention will be described. A magnetic tape cassette 40, comprises at least a magnetic tape, a memory MIC (Memory In Cassette) 41 for storing pack data as described above, and a communication terminal to permit communication between MIC 41 and the reading apparatus.

The recording apparatus includes a communication terminal and a communication controller (microcomputer for MIC processing 38) for writing into MIC 41 the tape information and positional information based on the audio/video signals recorded on the tape.

A television signal received by antenna 1 is selected by a tuner 2 and restored to a composite video signal and a composite audio signal. Alternatively, a composite video signal is selected by a switch 3a from an external input 4. The selected composite video signal is applied to a Y/C separator 6 and divided into a luminance signal (Y) and color difference signals (R-Y, B-Y).

The composite video signal is also applied to a synch separator 11 from which a vertical synchronizing signal and a horizontal synchronizing signal are derived. These signals serve as reference signals for a PLL (Phase Locked Loop) circuit to generate a basic sampling signal of 13.5 MHz locked with to input signal. Since this frequency is not needed for a normal color signal in a normal condition, the 13.5 MHz frequency is divided by a factor of 2 or 4 by divider 13 and the resultant frequency is used for sampling the color difference signals. Sampling is performed at a ratio of 4:1:1 for the NTSC format and 4:2:0 for the PAL format.

The analog outputs from the Y/C separator 6 are band limited by low-pass filters (LPFs) 7a, 7b and 7c to remove aliasing noise. The cutoff frequencies of these filters are, for example, 5.75 MHz for Y filter 7a; and 2.75 MHz for R-Y filter 7b and B-Y filter 7c. The filtered signals are then compressed into digital signals by A/D converters 8a, 8b and 8c, and converted into a block compressed code using Discrete Cosine Transformation by blocking circuit 9 by dividing data into blocks of 8 samples by 8 lines for each block. The resultant code is shuffled by a shuffling circuit 10 to prevent data recorded on the tape from being lost by a clogged tape head or by a transverse scratch on the tape. Shuffling circuit 10 also rearranges the luminance signal and the color difference signal.

A data compression encoder 14, which comprises a DCT compression circuit 14a, an estimating circuit 14b for estimating whether the amount of data that results, and a quantizer 14c for quantizing the compressed data, compresses the video data. The compressed video data is then packed by framing circuit 15 into a predetermined synchronous block. Data of the video auxiliary data sector (VAUX), audio auxiliary data sector (AAUX), and subcode sector and a track number to be stored in the subcode area are generated by a signal processing microcomputer 20 and are fed to interface units 17, 18, 19, respectively. The interface unit 17 for the VAUX sector generates an AP2 (application ID), which is combined with the framing output by a combining circuit 16. The interface unit 18 for the subcode area generates data SID and AP3 and also generates pack data SDATA.

An audio signal is selected by switch 3b either from the output from tuner 2 or from an external analog audio input signal. The selected audio signal is converted by A/D converter 21 into a digital signal. The digital signal is then shuffled by shuffling circuit 22 and; packed by framing circuit 23 into an audio synchronizing block by shuffling circuit 23. AAUX interface unit 19 supplies the AP1 data and the AAUX data packs to combining circuit 24.

A generator 25 generates ID or AV (audio/video) signals, a pre-sync signal and a post-sync signal, one of which is selected by a switch 26 and added to parity data produced by an error correction code generator 27. The resultant signal is sent to a channel encoder 42. In the channel encoder 42, randomizing circuit 29 randomizes the signal supplied thereto. The resultant signal is coded by a 24/25 converting circuit 30 to remove the DC component. Circuit 30 preferably is a Partial Response Class IV Circuit suitable for digital processing. The signal thus obtained is combined with an audio/video sync pattern and a subcode sync pattern by combining circuit 31. An ITI sector generator 33, is fed with APT (Application) ID data, SP/LP data, and PF data from a mode processing microcomputer 34. The ITI sector generator 33 packs this data into predetermined positions and applies resultant data to switch 32 which selects between this resultant data, a preamble and the output of combining circuit 31 in a timing pattern. A switch 43 selects an LP or an SP recording mode and the setting of switch 43 is sent to microcomputers 34 and 38.

A final recording signal obtained from channel encoder 42 is selected by a switch 35 and supplied alternatively to heads 37a and 37b after being amplified by head amplifiers 36a and 36b for recording on tape 40.

Microcomputer for MIC processing 38 then generates pack data and APT data which is written in MIC 41 in the cassette 40 via an MIC switch 39.

Figure 26:
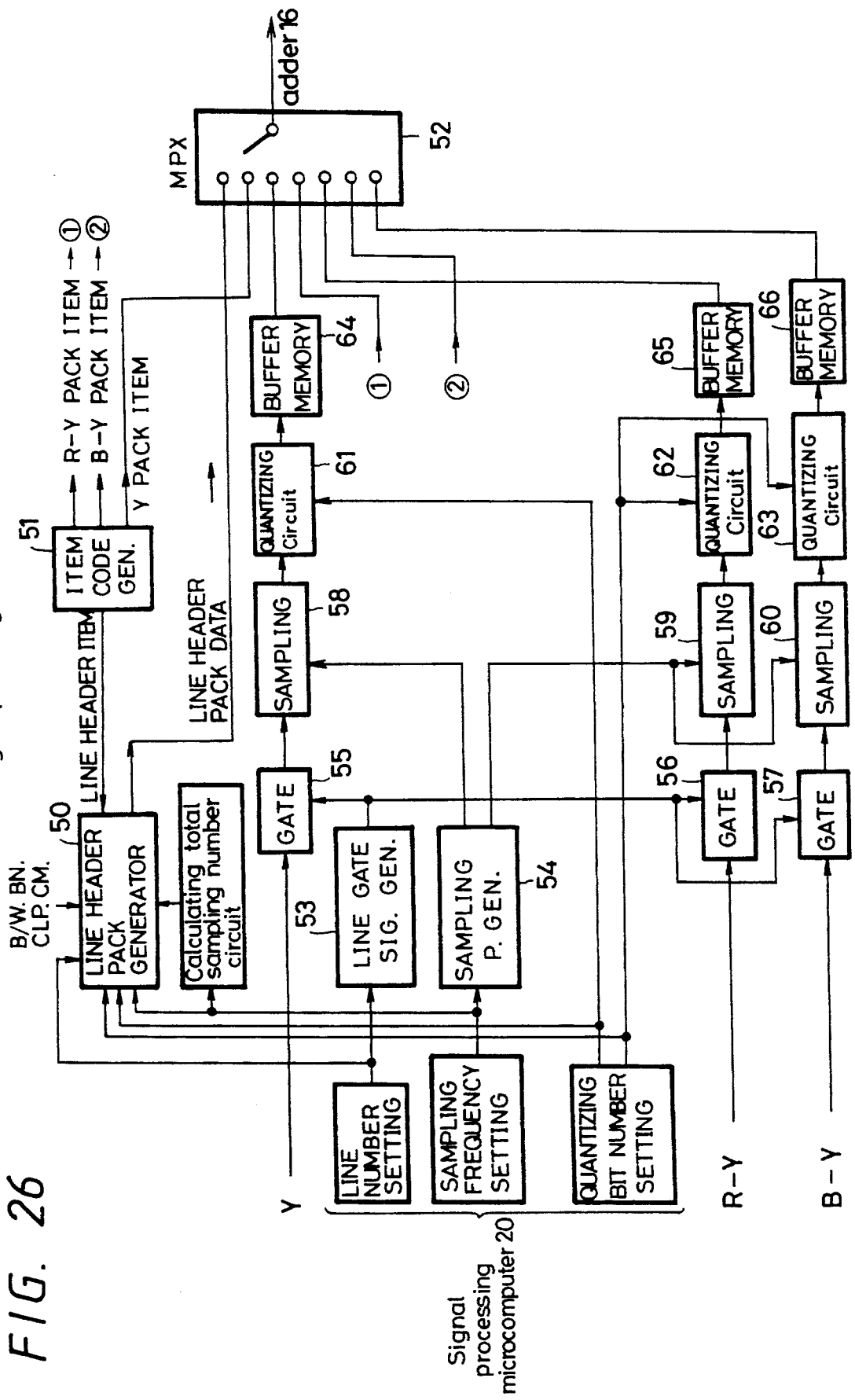
FIG. 26 is a second embodiment of a recording section for a digital VCR in accordance with this invention.

FIG. 26 shows an alternative embodiment of a portion of the recording circuit for the digital VTR of the present invention. In this embodiment, output from signal processing microcomputer 20 supplies B/W, EN, CLF, and CM data to line header pack generator 50. In addition, a line number setting indicating the number of the horizontal lines sampled, a sampling frequency setting indicating the sampling frequency of the sampled horizontal line, and a quantizing bit number setting are supplied to generator 50 from microcomputer 20. Line header pack generator 50 formats line header pack data in the pack format of FIG. 18(1) and supplies this pack data to multiplexer 52. Line header pack generator 50 also generates and supplies to item code generator 51 a line header item from which a Y pack item and R-Y and B-Y pack items are supplied to multiplexer 52.

Luminance signal Y and color difference signals, R-Y and B-Y are supplied respectively to gates 55, 56 and 57, which are controlled by line gate signal generator 53 based on the line number setting supplied by signal processing microcomputer 20 to permit only one horizontal line of luminance and color difference signals to be supplied to gates 55, 56, and 57 at a time. The output of gates 55, 56 and 57 are then respectively supplied to sampling circuits 58, 59 and 60 which have sampling rates controlled by sampling generator 54 based on the sampling frequency setting received from signal processing microcomputer 20. The sampled Y, R-Y and B-Y signals are then respectively quantized by quantizing circuits 61, 62 and 63 based on the quantizing bit number setting supplied by signal processing microcomputer 20. The quantized outputs of quantizing circuits 61, 62 and 63 are then temporarily stored in buffer memories 64, 65 and 66, respectively, and then supplied to multiplexer 52. Multiplexer 52 selects from line header pack data, Y, R-Y, B-Y pack items, and the outputs from the buffer memories and supplies this selected data to adder 16 to form a video data output as in FIG. 25.

Figures 2, 27A:
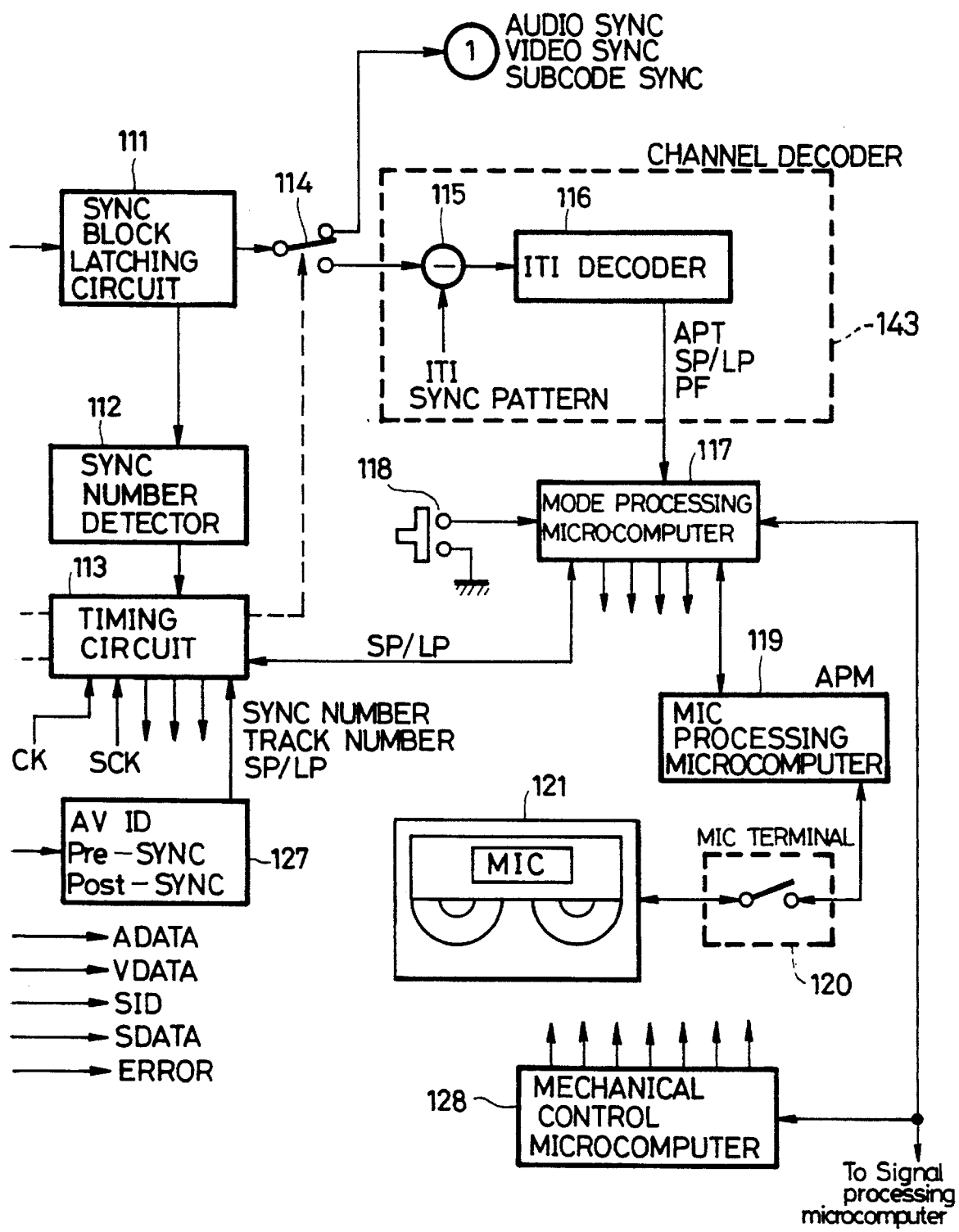
FIGS. 27A–27B are block diagrams showing an embodiment of a reproducing section for a digital VCR in accordance with this invention.
Figure 27B:
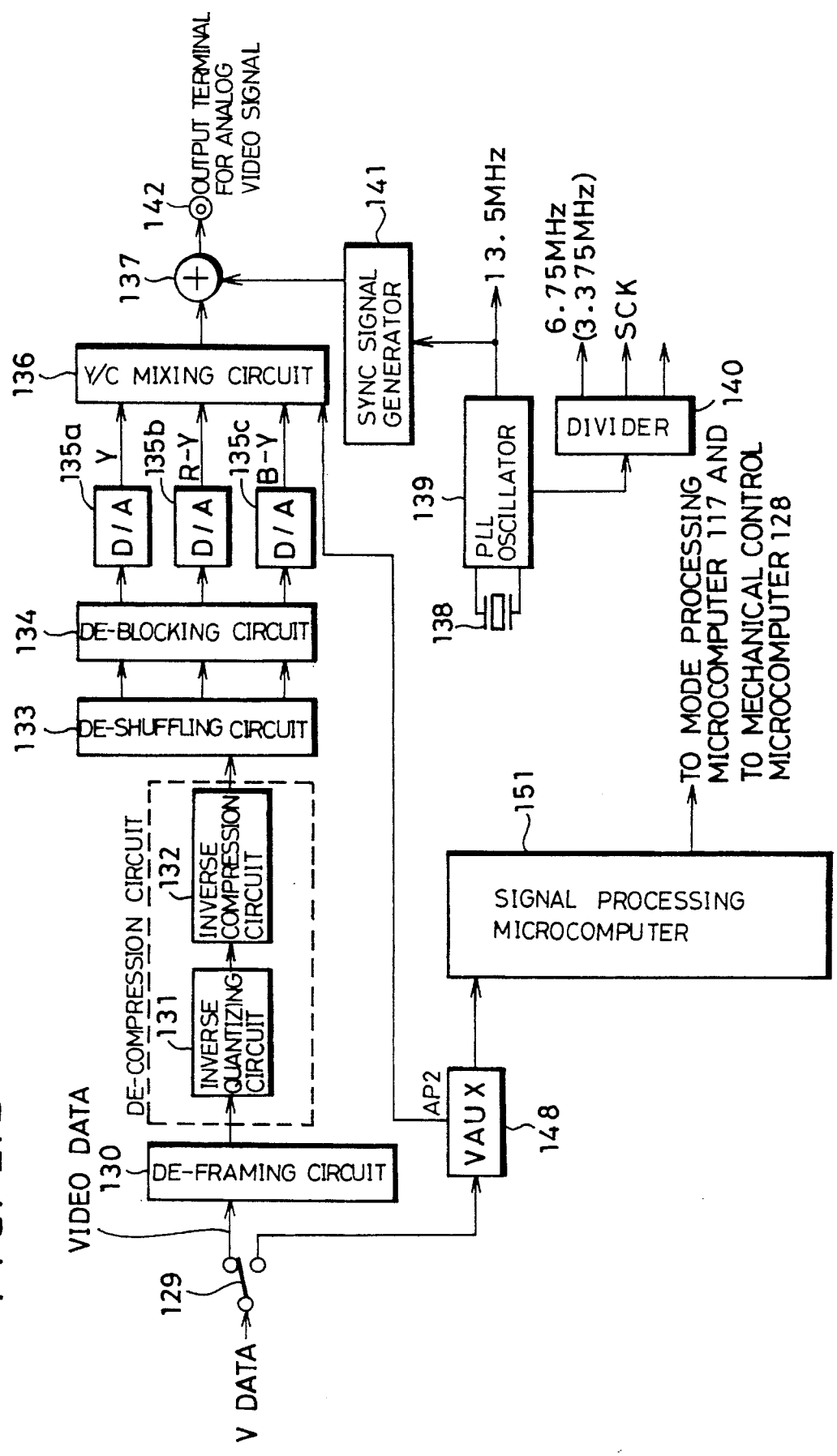

An embodiment of a reproducing apparatus for reproducing data stored in the packs of the present invention is shown in FIGS. 27A and 27B. Coded data in the format discussed above is read from a recording medium by heads 101a and 101b and the ITI sync pattern extracted. The ITI sync pattern is decoded by ITI decoder 116 of channel decoder 143 and from which the extraction of the audio sync data, the video sync data and the subcode sync data, as well as the SP/LP, PF, sync number and track number is synchronized. The audio area data, video area data and subcode area data are decoded by channel decoder 160, which comprises difference circuit 122, 24/25 inverse converting circuit 123 and inverse randomizing circuit 124. The output of channel decoder 160 is error-corrected by error correction circuit 125 and supplied to switch 126 from which audio data ADATA or video data VDATA (and other data not needed for an understanding of the present invention) is outputted.

Referring now to FIG. 27B, VDATA is supplied to switch 129. Video data is supplied to deframing circuit 130 and then supplied to a decompression circuit which includes inverse quantizing circuit 131 and inverse compression circuit 132. The decompressed output is then supplied to deshuffling circuit 133 and deblocking circuit 134 from which separated luminance signal Y and color difference signals R-Y and B-Y are derived. The separated signals are respectively supplied to digital-to-analog converters 135a, 135b and 135c for conversion to analog form; and the luminance and color difference signals are then supplied to luminance/color mixing circuit 135, and then to adding circuit 137 whereat the usual synchronizing signals are added thereto.

When the video data is of the type which originally was in the blanking period of the video signal, VDATA is supplied to VAUX circuit 148 by switch 129 to further disassemble and reconstitute the data. The reconstituted data is supplied to both signal processing microcomputer 151 and to luminance/color mixing circuit 136.

Figure 28:
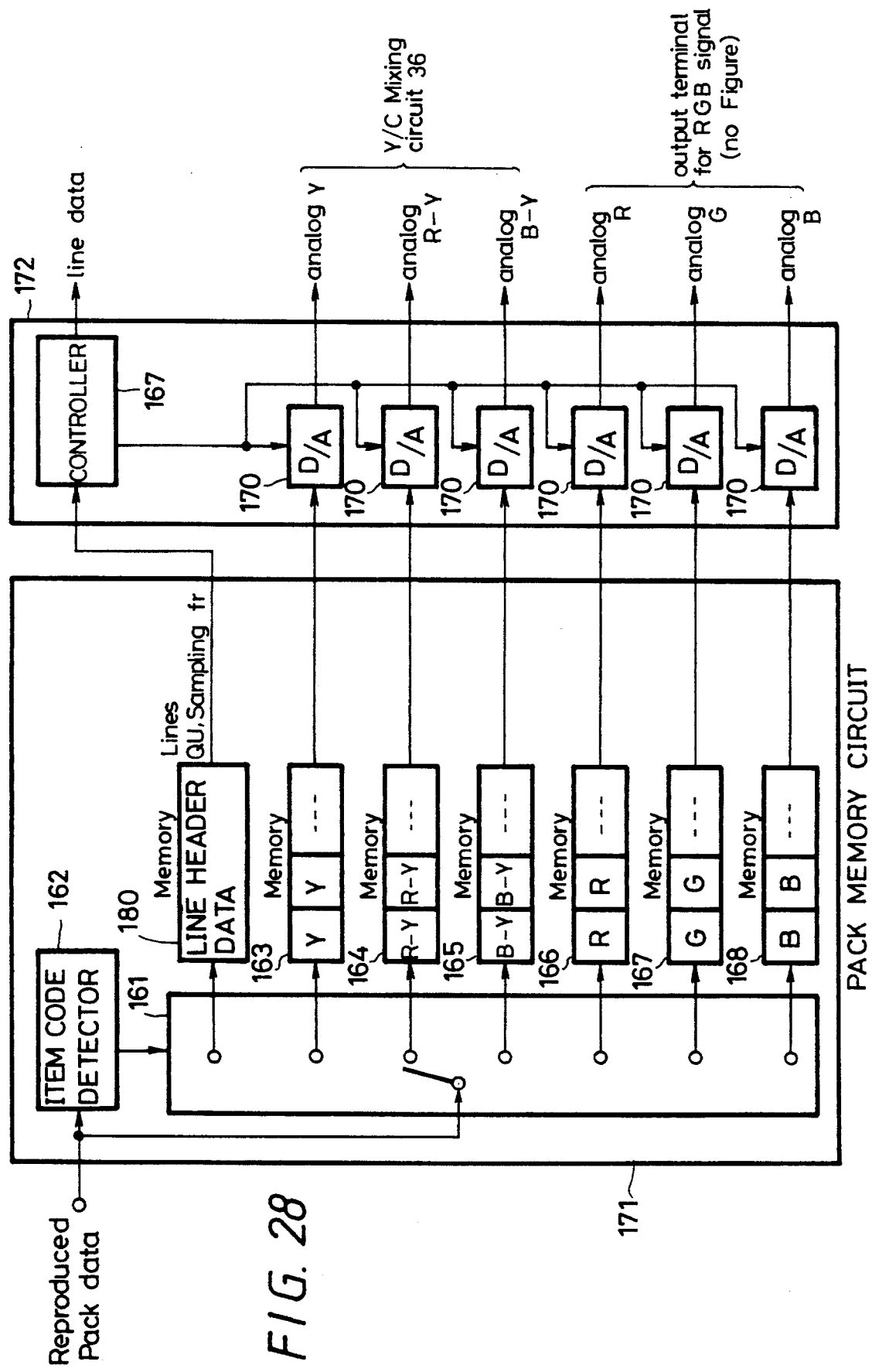
FIG. 28 is a block diagram showing in further detail an embodiment of the VAUX circuit of FIG. 27B.

FIG. 28 shows the VAUX circuit 148 in greater detail. The reproduced line pack data (FIGS. 18(1)–18(7)) is supplied to pack memory circuit 171 in which an item code detector 162 detects the small item data of the pack and supplies a control signal to switching circuit 161 based on the detected small item. Accordingly, the reproduced pack data is then supplied either to line header memory 180 which in turn supplies the line value, the QU and the sampling frequency to a controller 167 of converter 172. Alternatively, if the pack contains luminance signal Y or color difference signal R-Y or B-Y, or color signals R or G or B, the reproduced pack data is supplied to respective memory circuits 163–168 and then to a respective digital-to-analog converter circuit 170. The line data, and the converted analog Y, R-Y, and B-Y signals are in turn supplied to luminance/chrominance mixing circuit 36. Alternatively, if the output signals are color signals, the analog R, G, and B signals are supplied to an analog output terminal.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. An apparatus for recording digital video and audio signals in the form of coded signals having a recording format which includes video signal and accompanying video data recording areas for recording video signals and accompanying auxiliary video data, respectively and audio signal and accompanying audio data recording areas for recording audio signals and accompanying auxiliary audio data, respectively, said apparatus comprising:

framing means for framing a digital audio signal and a digital video signal thereby forming blocks of audio signals and blocks of video signals;

generating means for generating said accompanying auxiliary audio data and said accompanying auxiliary video data;

formatting means for formatting said accompanying auxiliary audio data and said accompanying auxiliary video data into accompanying audio data packs and accompanying video data packs, respectively, combining means for combining said blocks of audio signals with said accompanying audio data pack thereby forming combined audio information and for combining said blocks of video signals with said accompanying video data pack thereby forming combined video information;

identification parameter generating means for generating identification parameters corresponding respectively to said combined audio information or to said combined video information;

encoding means for encoding said identification parameters, said combined audio information and said combined video information into said coded signals; and recording means for recording said coded signals onto a recording medium.

2. The apparatus of claim 1, further comprising input terminal means for inputting a composite video signal and an audio signal;

analog-to-digital converting means for converting said composite video signal and said audio signal to a digital video signal and to a digital audio signal.

3. The apparatus of claim 2, further comprising data compression means for compressing said digital video signal and for supplying said compressed video signal to said framing means.

4. The apparatus of claim 1, further comprising error detecting means for identifying an uncorrectable error in said combined audio information or said combined video information and error indicating means for modifying said combined audio information or said combined video information in which said uncorrectable error is present to indicate the existence of said error.

5. The apparatus of claim 1, wherein said blocks of video signals formed by said framing means includes quantization data of said digital video signal and includes video data.

6. The apparatus of claim 5, wherein said quantization data includes quantization table numbers and switching points of said quantization table numbers.

7. The apparatus of claim 5, wherein said quantization data is repeatedly stored in plural blocks of video signals.

8. The apparatus of claim 5, wherein said accompanying auxiliary video data generated by said generating means includes a quantizing bit setting of said digital video signal.

9. The apparatus of claim 1, wherein said accompanying auxiliary video data generated by said generating means includes a line number setting and a sampling frequency setting of said digital video signal.

10. The apparatus of claim 1, wherein said generating means is a microprocessor.

11. The apparatus of claim 1, wherein said generating means further generates subcode data which includes location information for identifying a location on said recording medium.

12. The apparatus of claim 11, wherein said formatting means formats said subcode data into a subcode data pack and wherein said encoding means encodes said subcode data pack into said coded signals.

13. The apparatus of claim 1, wherein said packs comprise item data and succeeding data, and said item data determines the format and function of said succeeding data.

14. The apparatus of claim 13, wherein said item data formed by said formatting means indicates whether an error is present in said succeeding data.

15. The apparatus of claim 13, wherein said item data formed by said formatting means comprises an upper level item and comprising a lower level item, a value of said lower level item defining said function of said succeeding data depending upon a value of said upper level item.

16. The apparatus of claim 13, wherein said succeeding data formed by said formatting means includes flag data indicating whether data following said succeeding data is formed of packs.

17. The apparatus of claim 13, wherein said pack formed by said formatting means includes data derived from a horizontal line of a vertical blanking period of an input video signal.

18. The apparatus of claim 13, wherein said pack formed by said formatting means includes data derived from sampling luminance data of a horizontal line.

19. The apparatus of claim 13, wherein said pack formed by said formatting means includes data derived from sampling color difference data of a horizontal line.

20. The apparatus of claim 17, wherein said pack formed by said formatting means includes data derived from sampling color data of said horizontal line.

21. The apparatus of claim 13, wherein said pack formed by said formatting means includes data indicating that said digital video signal is a non-broadcast video signal.

22. The apparatus of claim 13, wherein said pack formed by said formatting means includes information restricting permission to copy said recorded coded signals.

23. The apparatus of claim 13, wherein said formatting means includes means for generating a pack of data derived from a horizontal line of said digital video signal.

24. The apparatus of claim 13, wherein said formatting means includes means for generating an item code for forming a pack of data derived from sampling luminance data and color difference data of a horizontal line of said digital video signal.

25. The apparatus of claim 13, wherein selected ones of said packs form a main region for storing data generic to said recording medium and additional ones of said packs form an optional region for storing data generated by a user of said apparatus.

26. The apparatus of claim 1, wherein said formatting means includes means for generating a line gate signal.

27. The apparatus of claim 1, wherein said formatting means includes means for generating a signal based on a sampling frequency of a horizontal line of said digital video signal.

28. The apparatus of claim 1, wherein said encoding means comprises a randomizing circuit and a 24/25 converting circuit.

29. The apparatus of claim 1, wherein said encoding means comprises second generating means for generating primary application data for indicating the format of said coded signals.

30. An apparatus for reproducing digital video and audio signals recorded on a recording medium in the form of coded signals having a recording format which includes video signal and accompanying video data recording areas in which video signals and accompanying auxiliary video data are recorded, respectively, and an audio signal and accompanying audio data recording areas in which audio data and accompanying auxiliary audio data are recorded, respectively, said apparatus comprising:

reading means for reading said coded signals from said recording medium;

decoding means for decoding said coded signals into combined audio information and into combined video information;

detecting means for detecting whether a portion of said combined video information contains blocks of said video signals or blocks of said accompanying video data packs and for separating said blocks of video signals and said blocks accompanying video data packs;

deframing means for deframing said blocks of video signals into digital video signals; and reproducing means for separating said blocks of accompanying video data pack in response to a portion of said accompanying auxiliary video data.

31. The apparatus of claim 30, further comprising decompressing means for decompressing said deframed digital video signals; and digital-to-analog converting means for converting said decompressed digital video signals into analog video signals.

32. The apparatus of claim 30, wherein said accompanying video data packs comprise item data and succeeding data, and said item data determines the format and function of said succeeding data.

33. The apparatus of claim 32, wherein said detecting means further comprises item data detecting means for detecting said item data.

34. The apparatus of claim 33, wherein said detecting means further comprises means for separating said succeeding data of said packs as a function of said item data detected by said item data detecting means.

35. An apparatus for recording and reproducing digital video and audio signals in the form of coded signals having a recording format which includes video signal and accompanying video data recording areas for recording video signals and accompanying auxiliary video data, respectively, and audio signal and accompanying audio data recording areas for recording audio signals and accompanying auxiliary audio data, respectively, said apparatus comprising:

framing means for framing a digital audio signal and a digital video signal thereby forming blocks of audio signals and blocks of video signals;

generating means for generating said accompanying auxiliary audio data and said accompanying auxiliary video data;

formatting means for formatting said accompanying auxiliary audio data and said accompanying auxiliary video data into accompanying audio data packs and accompanying video data packs, respectively;

combining means for combining said blocks of audio signals with said accompanying audio data packs thereby forming combined audio information and for combining said blocks of video signals with said accompanying video data packs thereby forming combined video information;

identification parameter generating means for generating identification parameters corresponding respectively to said combined audio information or to said combined video information;

encoding means for encoding said identification parameters, said combined audio information and said combined video information into said coded signals;

recording means for recording said coded signals onto a recording medium;

reading means for reading said coded signals from a recording medium;

decoding means for decoding said coded signals into combined audio information and into combined video information;

detecting means for detecting whether a portion of said combined video information contains blocks of video signals or blocks of accompanying video data packs and for separating said blocks of video signals and said blocks accompanying video data packs;

deframing means for deframing said blocks of video signals into digital video signals; and reproducing means for separating said portion consisting of accompanying video data packs in response to a portion of said accompanying auxiliary video data.

36. The apparatus of claim 35, wherein said packs comprise item data and succeeding data, and said item data determines the format and function of said succeeding data.

37. The apparatus of claim 36, wherein said detecting means comprises means for detecting said item data.

38. The apparatus of claim 37, wherein said detecting means further comprises means for separating said succeeding data of said packs as a function of a portion of said item data detected by said means for detecting.

\* \* \* \* \*